(12) United States Patent  
Haga et al.

(10) Patent No.: US 7,716,690 B2  
(45) Date of Patent: May 11, 2010

(54) DISK-STORING DISK DEVICE WITH RESTRICTING MECHANISM

(75) Inventors: Satoshi Haga, Iwaki (JP); Shoji Suzuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 897 days.

(21) Appl. No.: 11/529,702

(22) Filed: Sep. 26, 2006

(65) Prior Publication Data

US 2007/0079320 A1   Apr. 5, 2007

(30) Foreign Application Priority Data

Sep. 30, 2005   (JP)   ............... 2005-286126

(51) Int. Cl.  
*G11B 17/03* (2006.01)  
*G11B 17/04* (2006.01)  
*G11B 33/02* (2006.01)

(52) U.S. Cl. ............... 720/619; 720/614; 720/621; 720/622

(58) Field of Classification Search ............... 720/624, 720/625, 690, 706, 713, 619, 614, 621, 622; 369/30.77, 30.78, 30.81, 30.85, 30.87, 30.9, 369/30.92

See application file for complete search history.

(56) References Cited

U.S. PATENT DOCUMENTS 6,097,693 A   8/2000   Nakamichi

2003/0112718 A1 *   6/2003   Otsuki ............... 369/30.85  
2003/0198147 A1 *   10/2003   Watanabe et al. ........ 369/30.85  
2006/0262437 A1   11/2006   Tokita et al.

FOREIGN PATENT DOCUMENTS

| JP | 10-293954 | 11/1998 |
| JP | 2001-266449 | 9/2001 |
| JP | 2004-071148 | 3/2004 |
| JP | 2004-303355 | 10/2004 |

* cited by examiner

*Primary Examiner*—Andrea L Wellington  
*Assistant Examiner*—Gustavo Polo  
(74) *Attorney, Agent, or Firm*—Brinks Hofer Gilson & Lione

(57) ABSTRACT

A disk-storing disk may include multiple supporting members for supporting disks and being stacked in the axial direction; a supporting member selecting mechanism for moving a supporting member to a selecting position; a driving unit having a rotational driving unit for clamping and rotating a disk held by the supporting member at the selecting position; a transporting mechanism for transporting a disk inserted from an insertion opening of the casing to the selected supporting member at the selecting position; and a restriction guide member having a restriction face and being turnably supported between a guiding attitude and a non-acting attitude; wherein, when a disk is transported toward a supporting member at the selecting position by the transporting mechanism, the restriction guide member turns to the guide attitude, and when the supporting member is moved by the supporting member selecting mechanism, the restriction guide member turns to the non-acting attitude.

17 Claims, 22 Drawing Sheets

X1 ←→ X2

DISK-STORING DISK DEVICE WITH RESTRICTING MECHANISM

RELATED APPLICATIONS

The present application claims priority to Japanese Patent Application Serial Number 2005-286126, filed Sep. 30, 2005, the entirety of which is hereby incorporated by reference.

BACKGROUND OF THE INVENTION

1. Field of the Invention

The present invention relates to a disk-storing disk device wherein multiple disks are stored within a casing, and the disks are selected and driven.

2. Description of the Related Art

Japanese Unexamined Patent Application Publication No. 2004-63017 (hereafter referred to as "known document") discloses a disk changer wherein multiple supporting members are stored within a casing. Disks inserted from an insertion opening in the casing are each held by supporting members. Provided within the casing is a supporting member selecting mechanism for selecting one of the multiple supporting members and spreading a spacing between the selected supporting member and another supporting member adjacent thereto.

With the disk changer described in the above known document, a driving unit having a turntable on a tip thereof is provided within the casing. The driving unit turns on a supporting axis, serving as a pivot, situated at the base thereof, and turns from a position away from a perimeter of a disk supported by a supporting member and toward an interior of the casing. The driving unit enters the space between the selected supporting member and the supporting member situated below, and the disk held by the selected supporting member is clamped to the turntable.

In the above described disk changer, when loading a new disk to a supporting member, one of the multiple supporting members is selected, and a disk inserted from an insertion opening of the casing is supplied to the selected supporting member. With arrangements where the disk inserted at the insertion opening is supplied to the supporting member by a transporting roller, the portion of the disk that is farther inside of the casing than the position of the transporting roller may deviate vertically. Accordingly there are cases where the disk cannot be supplied to the supporting member in a sure manner.

SUMMARY OF THE INVENTION

The present invention has been made to solve the above-described problem of the conventional art, and accordingly, it is an object of the present invention to provide a disk-storing disk device wherein a selected supporting member supports a disk that is transported into the casing in a sure manner.

According to a first aspect of the invention, a disk-storing disk device comprises a casing that includes a plurality of supporting members which are capable of supporting a disk and which are disposed in a stacked manner in an axial direction of the disk; a supporting member selecting mechanism for moving one of the supporting members to a selecting position; a driving unit having a rotational driving unit for clamping a disk held by the supporting member at the selecting position, and rotationally driving the disk; a transporting mechanism for transporting a disk inserted at an insertion opening of the casing to the selected supporting member at the selecting position; a restriction guide member having a restriction face and being turnably supported between a guiding attitude and a non-acting attitude; and a transmitting member for turning the restriction guide member; wherein, in the event that a disk is transported toward a supporting member at the selecting position by the transporting mechanism, the restriction guide member assumes the guide attitude and faces the supporting member at the selecting position, and in the event that a disk is transported between the supporting member and the restriction face, and the supporting member is moved by the supporting member selecting mechanism, the restriction guide member assumes the non-acting attitude and is retracted to a position where the restriction face does not overlap with the supporting member and the disk supported thereby.

In one embodiment of the disk-storing disk device, when the disk is carried in, the restriction guide member turns to the guide attitude and the restriction face thereof faces the supporting member, so that the disk is guided in between the restriction face and the supporting member such that the disk is supplied to the supporting member in a sure manner.

The restriction guide member may be turnably supported by a face within the casing such as the face facing an edge of the supporting member extending along the direction of movement of the supporting member. When the restriction guide member assumes the guide attitude, the orientation of the restriction face may be such that the restriction face is parallel with the face of the disk supported by the supporting member at the selecting position and the restriction face faces the edge of the disk. When the restriction guide member assuming the non-acting attitude, the orientation of the restriction face may be such that the restriction face is perpendicular to the face of the disk supported by the supporting member at the selecting position and the restriction face is retracted to a position so as to not overlap with the disk.

With this configuration, the restriction guide member is turnably supported on the face extending in the direction of moving movement of the supporting member, so that the restriction guide member can be turned between the guide attitude and the non-acting attitude in a small space.

For example, the restriction guide member may be directly supported on the side face of the casing and the supporting member disposed within the side face of the casing, thereby configuring the casing in a small size.

Each of the supporting members may comprise a holding member for holding disks between the supporting member and the holding member, with the restriction face extending further toward the transporting mechanism side than the holding member when the restriction guide member is assuming the guide attitude. When the restriction face is facing a supporting member at the selecting position, the disk transported by the transporting mechanism is supplied to between the restriction face and the supporting member at the selecting position, following which the disk is transported to a position where the disk can be held between the holding member and the supporting member.

With this configuration, following the disk carried in by the transporting mechanism entering between the restriction face and the supporting member, the disk is supplied to between the holding member and the supporting member so that the disk can be supported by the supporting member in a sure manner without coming loose from the holding member.

The disk-storing disk device may further comprise: a shutter for opening/closing of an insertion opening of the casing; and a switchover member for switchover of the shutter between an opened state and a closed state; with the restriction guide member being turned between the guide attitude and the non-acting attitude by the moving force of the switchover member via the transmission member, and in the event that the shutter is in the opened state by the switchover member, the restriction guide member is turned to the guide attitude.

With this configuration, the shutter opening/closing operations and the restriction guide member turning operations can be synchronized, and further, the shutter and the restriction guide member can be operated with the moving force of the same switchover member so that the structure of the mechanism can be simplified.

Accordingly, with the disk-storing disk device according to the present invention, disks transported in by the transporting mechanism can be supplied to and supported by a supporting member at the selection position in a sure manner.

BRIEF DESCRIPTION OF THE DRAWINGS

FIGS. 2A and 2B are frontal views of one embodiment of the casing of the disk-storing disk device, wherein FIG. 2A illustrates a transportation unit within the casing, and FIG. 2B illustrates a supporting member selecting mechanism and driving unit;

DESCRIPTION OF THE PREFERRED EMBODIMENTS

Overall Configuration

Figure 1:
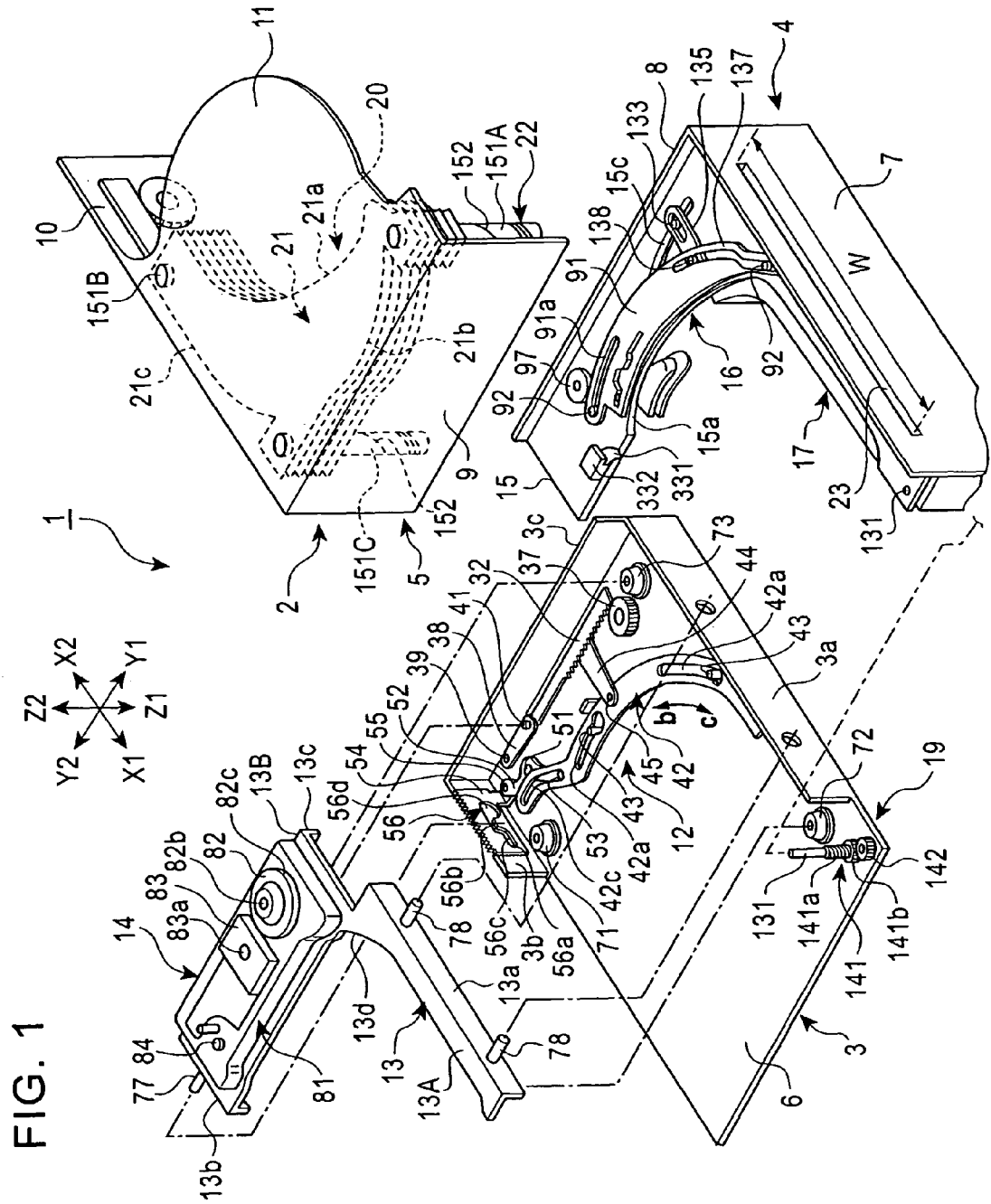
FIG. 1 is a disassembled perspective view illustrating the overall configuration of an embodiment a disk-storing disk device.

A disk-storing disk device 1 shown in FIG. 1 includes a box-shaped casing 2. The reference directions of this casing 2 are as follows: the Z1 side is the lower side, the Z2 side is the upper side, the X1 side is the left side, the X2 side is the right side, the Y1 side is the near side, and the Y2 side is the far side. Further, the X1-X2 direction is the horizontal direction, and the Y1-Y2 direction is the vertical direction.

The casing 2 includes a lower casing 3, middle casing 4, and upper casing 5 being stacked from the bottom up in that order. The lower casing 3 includes a base face 6 of the casing 2 and the middle casing 4 includes a front face 7 and a right side face 8. The upper casing 5 includes a left side face 9, a rear side face 10 and a ceiling face 11.

A first motive force transmission mechanism 12 is provided on the upper face of the base face 6 of the lower casing 3. A unit supporting base 13 is supported above the first motive force transmission mechanism 12, and a driving unit 14 is mounted on the unit supporting base 13. A mechanism base 15 parallel to the base face 6 is provided to the upper part of the middle casing 4, and a second motive force transmission mechanism 16 is provided above the mechanism base 15. In the middle casing 4, a transporting unit (transporting mechanism) 17 is provided below the mechanism base 15 and on the inner side of the front face 7. A third motive force transmission mechanism 19 is provided between the edge of the left side (X1 side) of the transporting unit 17 and the base face 6 of the lower casing 3. The third motive force transmission mechanism 19 functions as roller driving means.

At the upper casing 5, a region defined by the left side face 9, rear side face 10 and ceiling face 11 serves as a disk storing region 20. The disk storing region 20 includes multiple supporting members 21, each capable of supporting a disk D. In one embodiment, there are six supporting members 21 provided, with the supporting members 21 stacked in an axial direction. A supporting member selecting mechanism 22 is provided to the upper casing 5, and the supporting member selecting mechanism 22 operates such that one of the size supporting members 21 is selected and moved to a selection position (a) as shown in FIG. 2B. Further, the gap between the selected supporting member 21 and the supporting member 21 adjacent thereto below is spread.

Typically, the disk D has a diameter of 12 cm, and is for example, a CD (compact disk), CD-ROM, DVD (digital versatile disk), or the like.

Figure 2A:
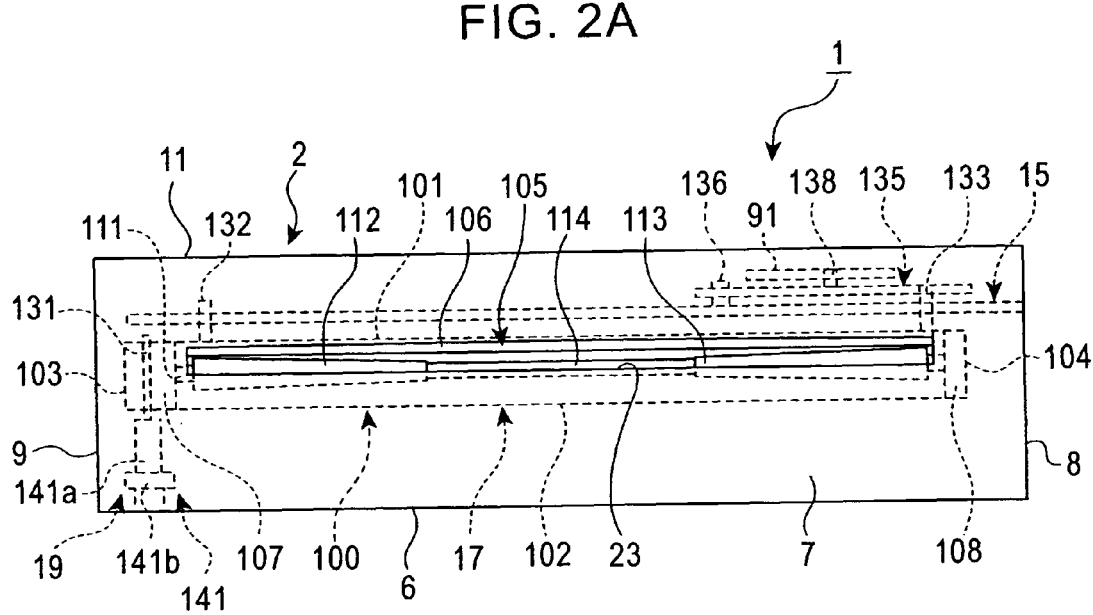
Figure 2B:
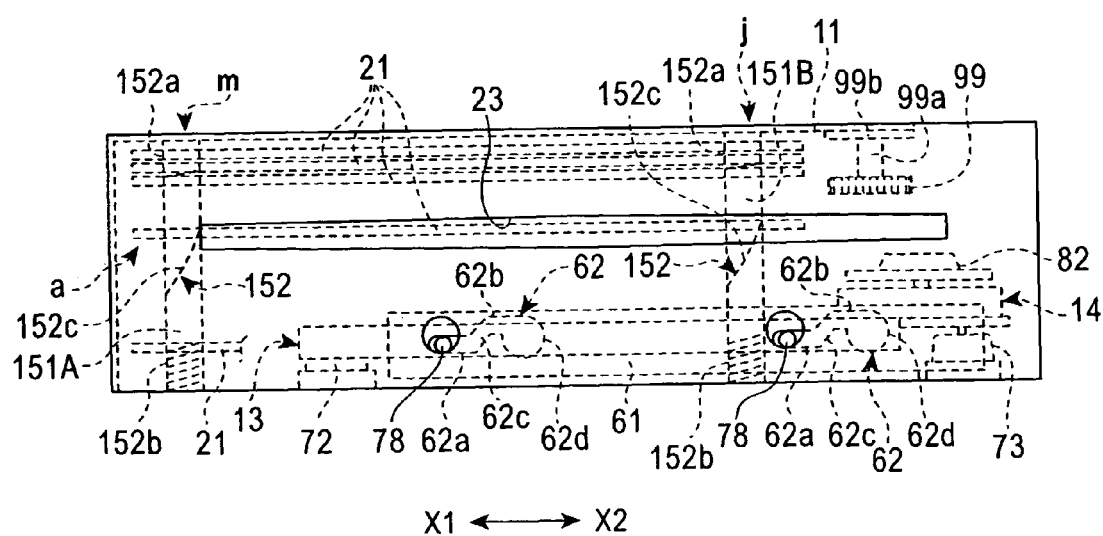
Figure 18A:
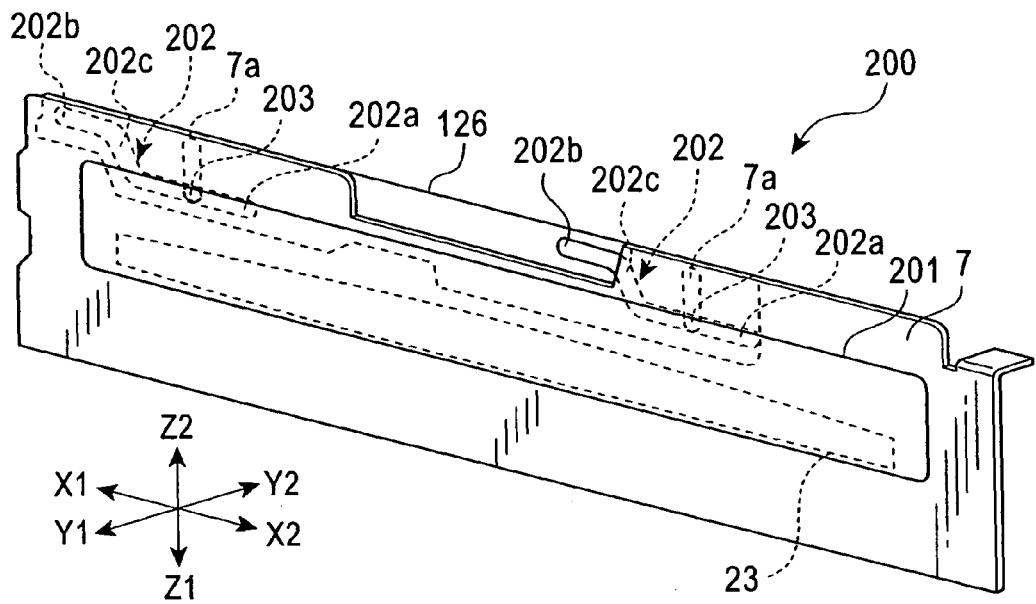
FIGS. 18A and 18B are partial perspective view diagrams illustrating the opening/closing operation of a shutter provided on the front face of the casing.
Figure 18B:
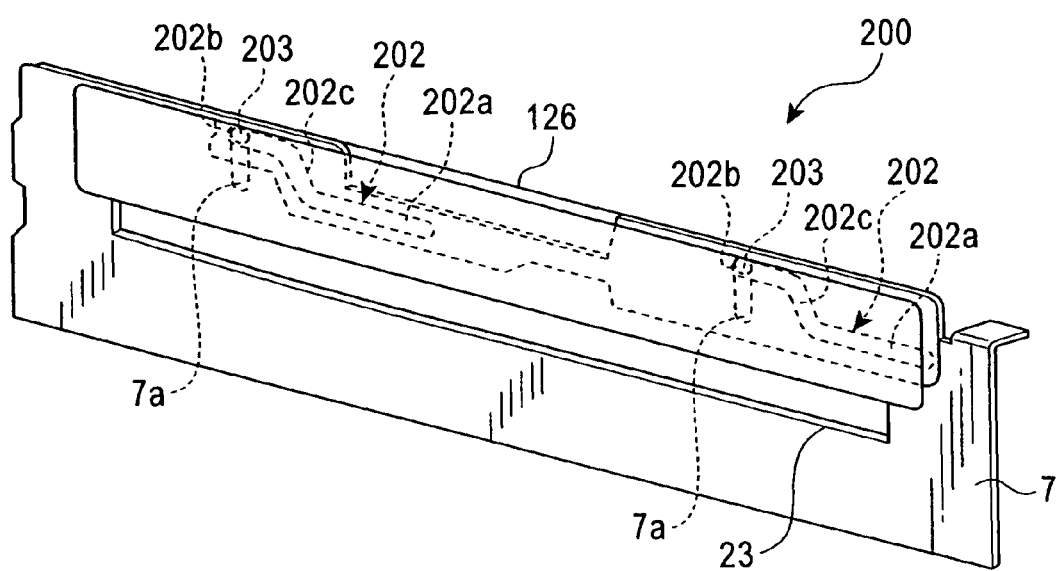

As shown in FIGS. 2A and 2B, an insertion opening 23 is formed on the front face 7 of the casing 2. The insertion opening 23 is formed as a slit, with the vertical dimensions being slightly larger than the thickness dimensions of the disk D, and the opening width dimensions W in the horizontal direction being slightly greater than the diameter of the disk D. As shown in FIGS. 18A and 18B, an arrangement may be made to configure a shutter 201 provided on the surface of the front face 7 of the casing so that the insertion opening 23 can be opened/closed with the shutter 201.

As shown in FIG. 2A, the transporting unit 17 is positioned at the same height as the insertion opening 23, and the transporting unit 17 transports a disk D inserted at the insertion opening 23 to the disk storing region 20. As shown in FIG. 2B, of the multiple supporting units 21, the supporting unit 21 which has reached the selection position (a) attains the same height as the insertion opening 23, and the transporting unit 17 transports the disk D inserted at the insertion opening 23 and is supported to the lower face (Z1 side face) of the supporting member 21 at the selection position (a), and is thus supported.

Figure 21:
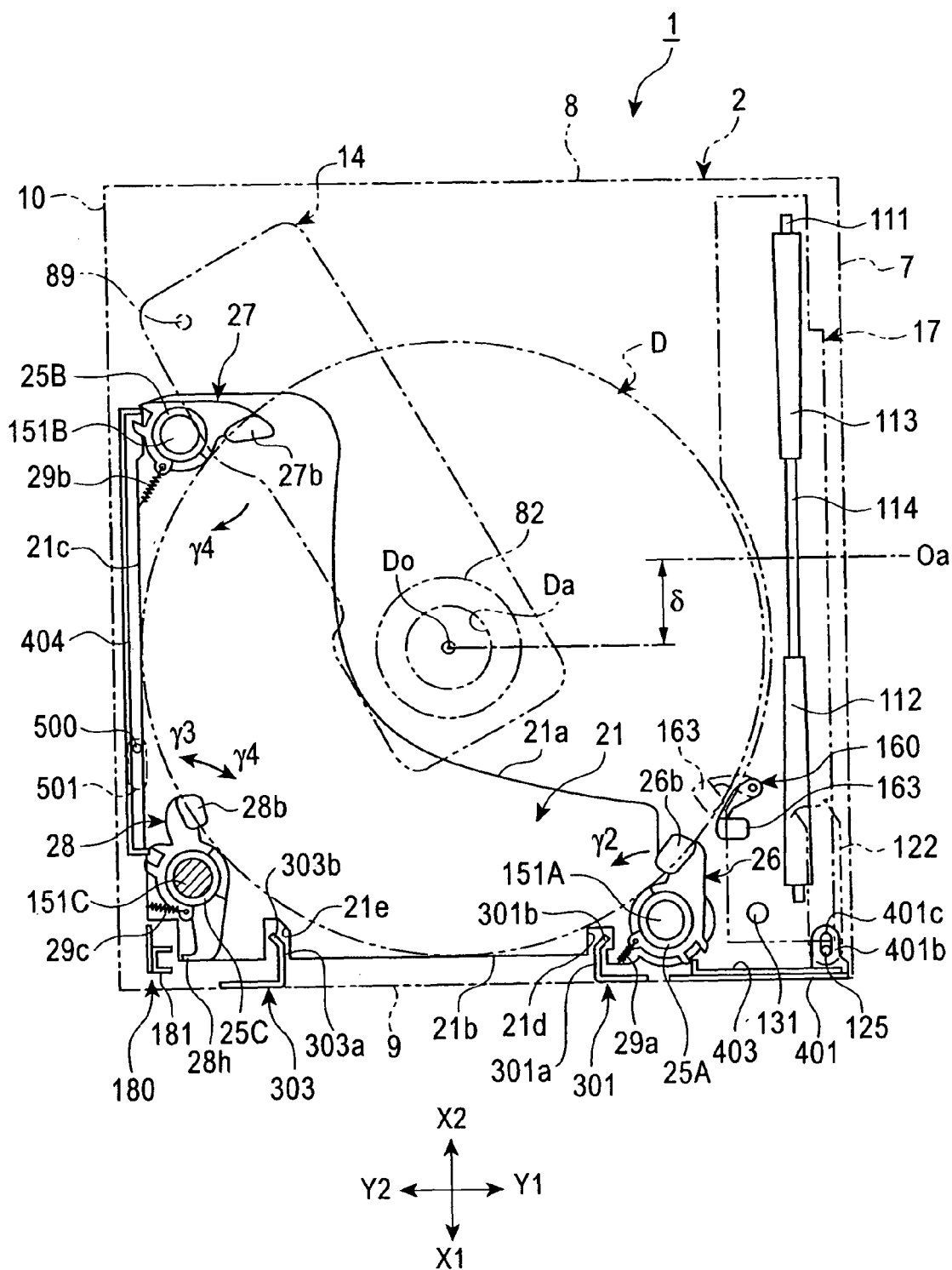

FIG. 21 illustrates the casing 2 from the ceiling face 11 side. An imaginary line which bisects the width dimensions W of the insertion opening 23 formed on the front face 7 of the casing 2 and which is orthogonal to the front face 7 and extends inward in the casing 2 is taken as an insertion center line Oa. The center D0 of the disk D supported by the supporting member 21 within the disk supporting region 20 is at a position shifted toward the left side (X1 side) from the insertion center line Oa by a distance of δ. The distance δ is 1/10 of the diameter of the disk D or greater.

Figure 6:
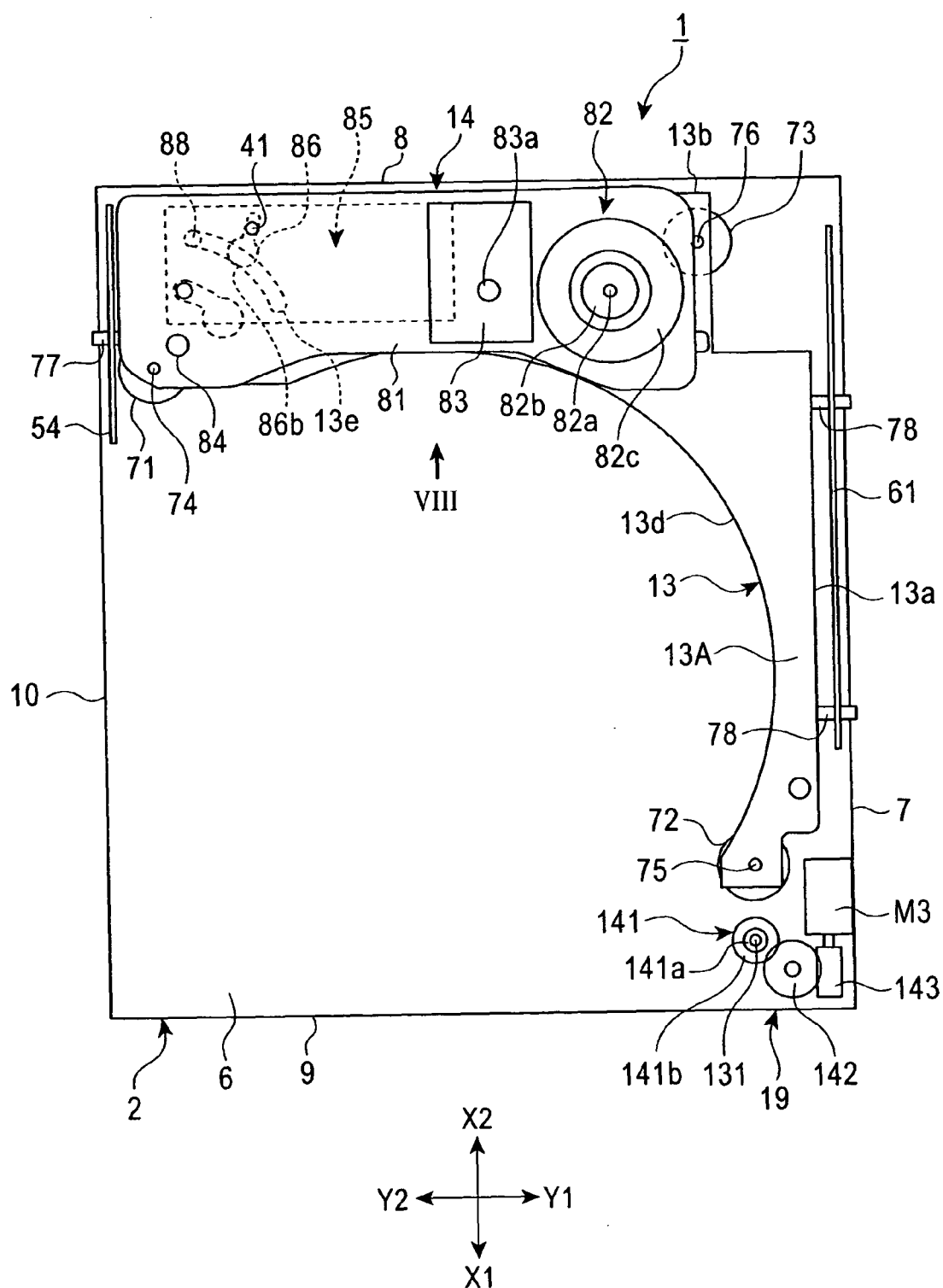
FIGS. 6 and 7 are plan views illustrating one embodiment of the driving unit and unit supporting base.
Figure 8:
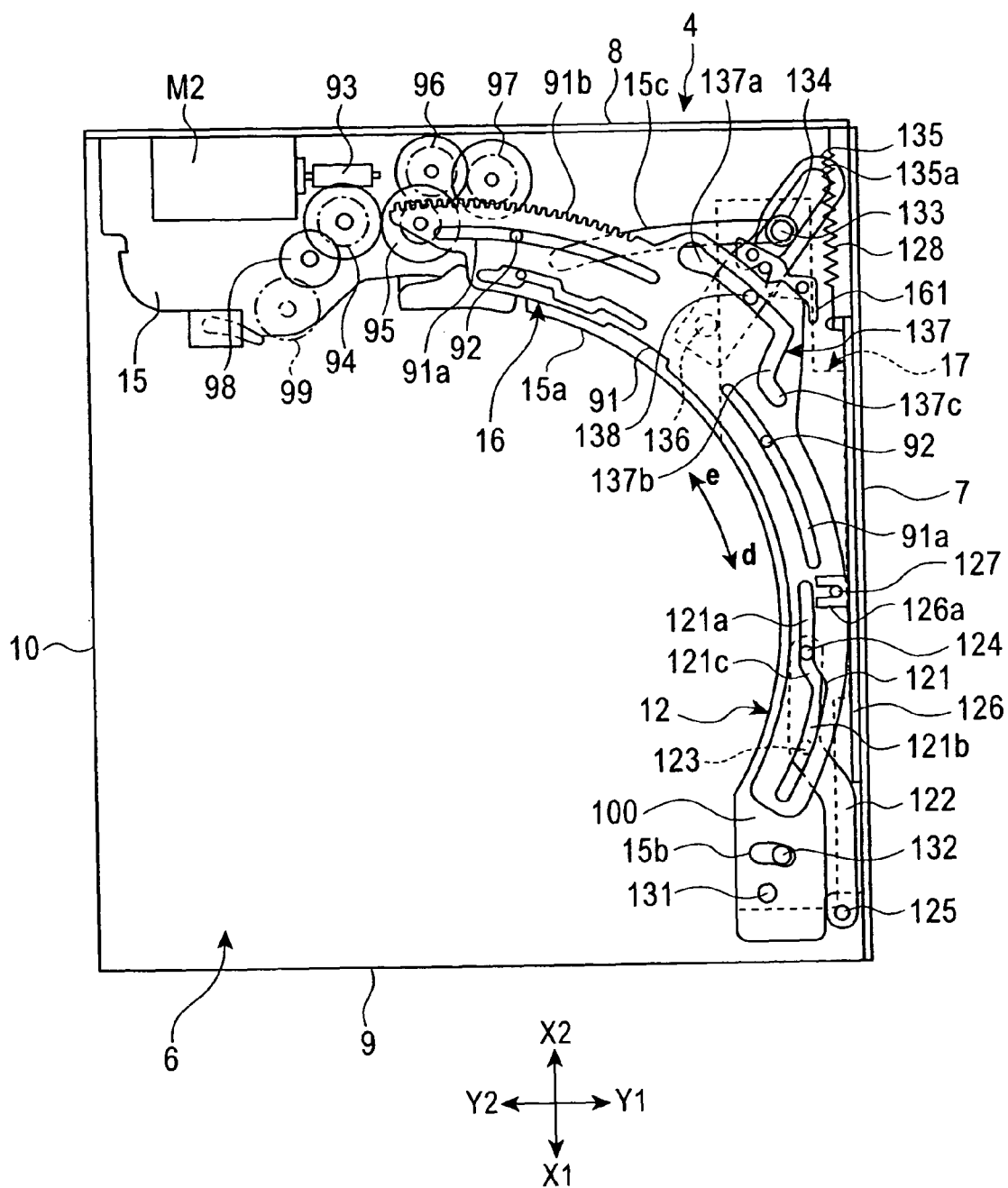
FIGS. 8 and 9 are plan views illustrating the configuration of one embodiment of a second motive power transmission mechanism.

In FIG. 6, the driving unit 14 is shown at a retracted position. The driving unit 14 at this time is positioned inside of the right side face 8 at a position away from the insertion center line Oa to the right side (X2 side), placing the driving unit 14 at a position removed from the perimeter of the disk D supported by the supporting member 21. In FIG. 8, the transporting unit 17 is in a standby position. The transporting unit 17 at this time is at a position immediately on the inside of the front face 7 and at a position slightly removed from the perimeter of the disk D supported by the supporting member 21.

Figure 19:
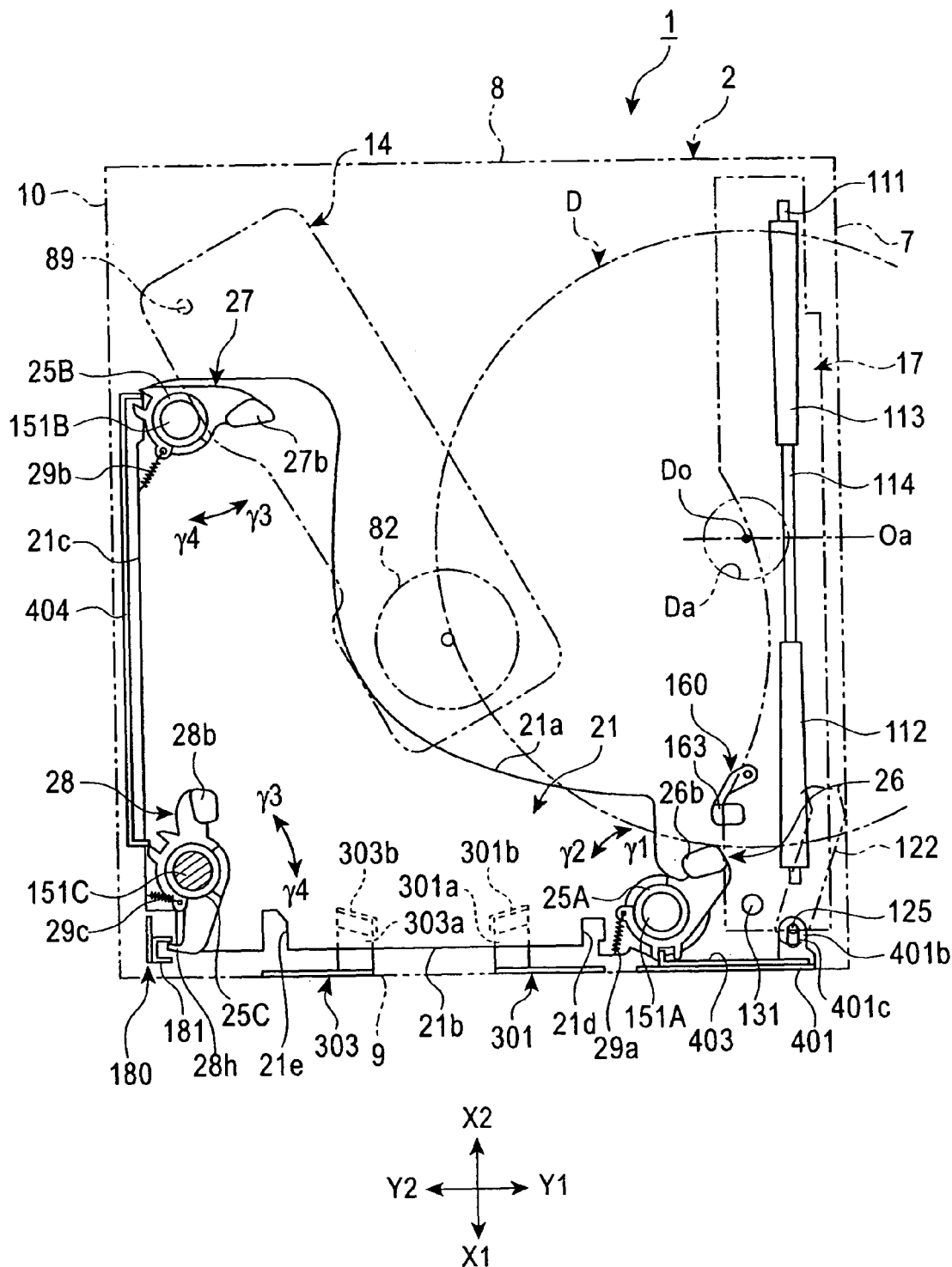
FIGS. 19 through 22 are plan view diagrams illustrating a supporting operation of the disk with the disk carry-in operation and the supporting unit.
Figure 20:
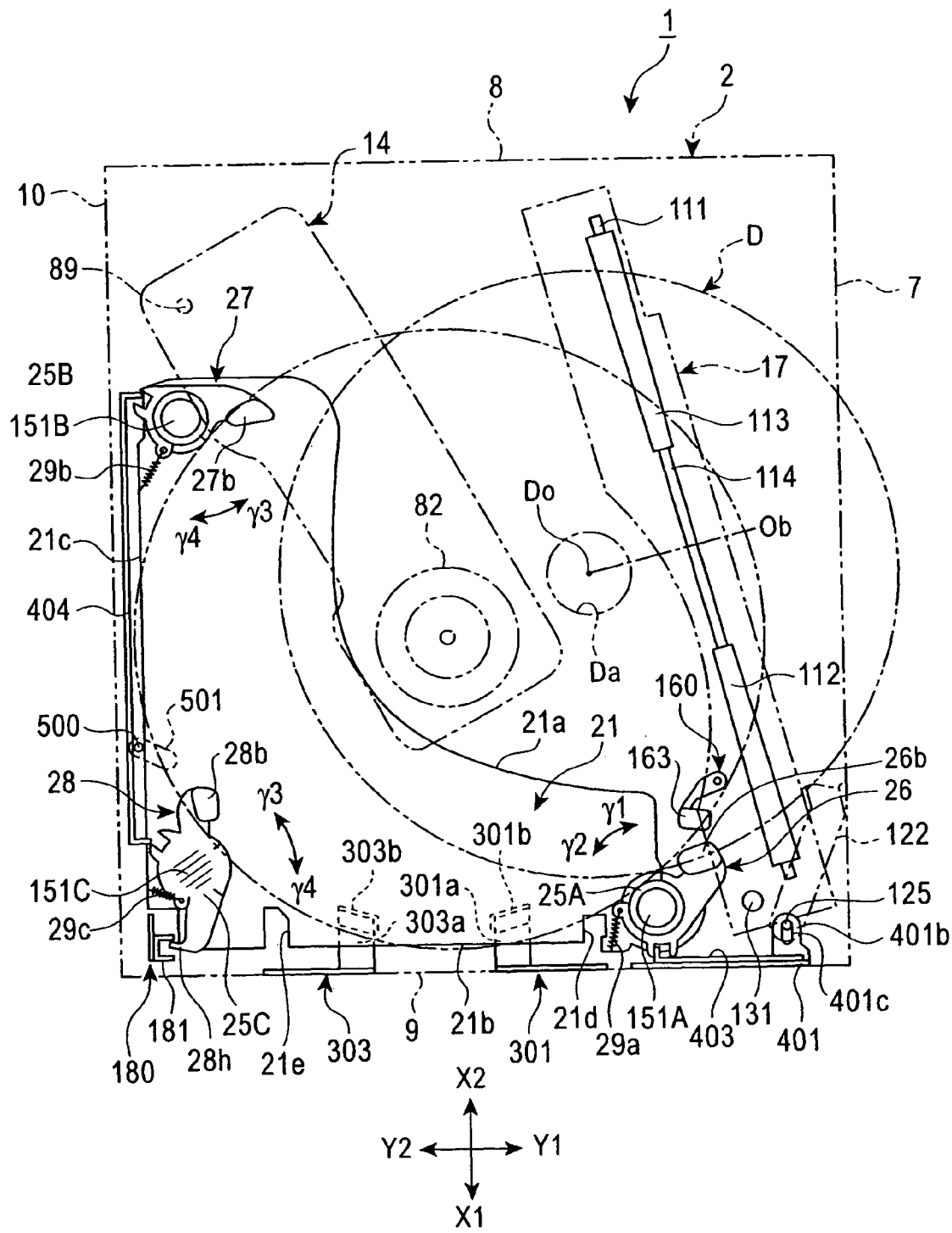

As shown in FIG. 20, the driving unit 14 turns in the clockwise direction within the casing 2 to reach an intervention position, and the transporting unit 17 turns in the counter-clockwise direction to reach the transporting action position. There is a portion within the casing 2 wherein the turning region of the driving unit 14 and the turning region of the transporting unit 17 overlap. However, as shown in FIG. 19, when the driving unit 14 turns in the clockwise direction to stop at the intervention position, the transporting unit 17 operates to turn between the retracted position and the transporting action position so that the driving unit 14 and the transporting unit 17 never collide. Arranging the disk storing region 20, driving unit 14, and transporting unit 17 in this way enables the inner space of the casing 2 to be used efficiently. Within the casing 2, the arrangement is such that the transporting unit 17 is at the near side and the disk storing region 20 is provided at the far side so that reduction in the depth-wise dimensions of the casing 2 can be maximized. In this embodiment, the depth-wise dimensions of the casing 2 (Y1-Y2 direction dimensions) are below the so-called 1 DIN size.

As shown in FIGS. 1 and 2A, the mechanism base 15 of the middle casing 4 shown in FIG. 1 is positioned above the driving unit 14 and the transporting unit 17. However, as shown in FIGS. 1 and 8, an inner edge 15a of the mechanism base 15 facing the inner side of the casing 2 (the X1 direction in the drawing) is at a position slightly removed from the perimeter of the disk D supported by the supporting member 21 of the disk storing region 20. As shown in FIG. 2B, the supporting unit 21 within the disk storage region 20 can be raised from a position in the vicinity of the upper side of the base face 6 of the casing 2 to a position in the vicinity of the inner side of the ceiling face 11. The mechanism base 15 is positioned at a height in the middle of the vertical movement region of the supporting unit 21, and also is disposed along the inner side of the front face 7 and the inner side of the right side face 8 of the casing 2.

First Motive Power Transmission Mechanism

The structure of one embodiment of the first motive power transmission mechanism 12, disposed on the base face 6 of the casing 2, will be described, with reference to FIGS. 1, 3 through 5 and 10.

As shown in FIG. 1, at the front of the lower casing 3 is a front bent piece 3a bent perpendicularly from the base face 6.

Similarly, at the back is a back bent piece 3b, and at the right side is a right side bent piece 3c, bent perpendicularly from the base face 6.

Each member configuring the first operational mechanism 12 is disposed along the inner side of the front face 7 and the inner side of the right side face 8 of the casing 2 so as not to abut against the perimeter of the disk D stored within the disk storage region 20. The supporting unit 21 at the bottom-most edge within the disk storage region 20 can be lowered to a position near the base face 6, and a configuration may be made wherein the various members configuring the first motive force transmission mechanism 12 do not abut against the perimeter of the disk D held by the supporting unit 21.

Figure 3:
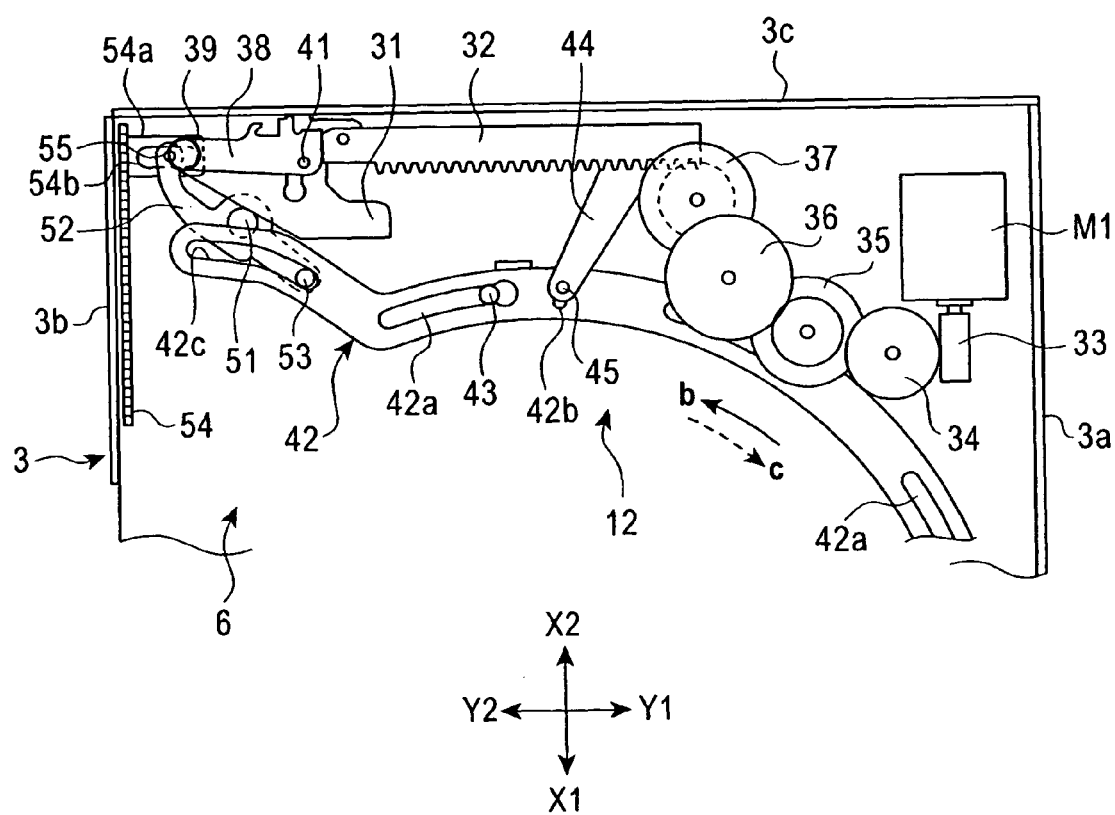
FIGS. 3 through 5 are plan views illustrating one embodiment of the configuration of a first motive power transmission mechanism situated on the base of the casing.
Figure 4:
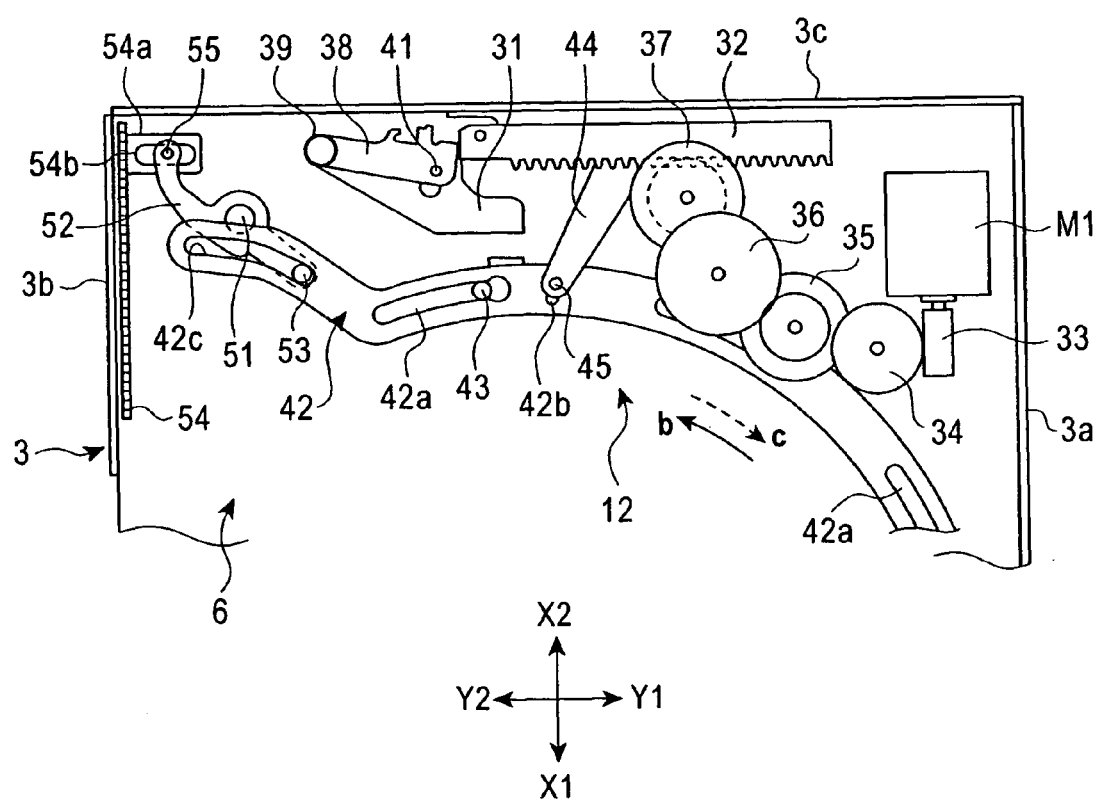
Figure 5:
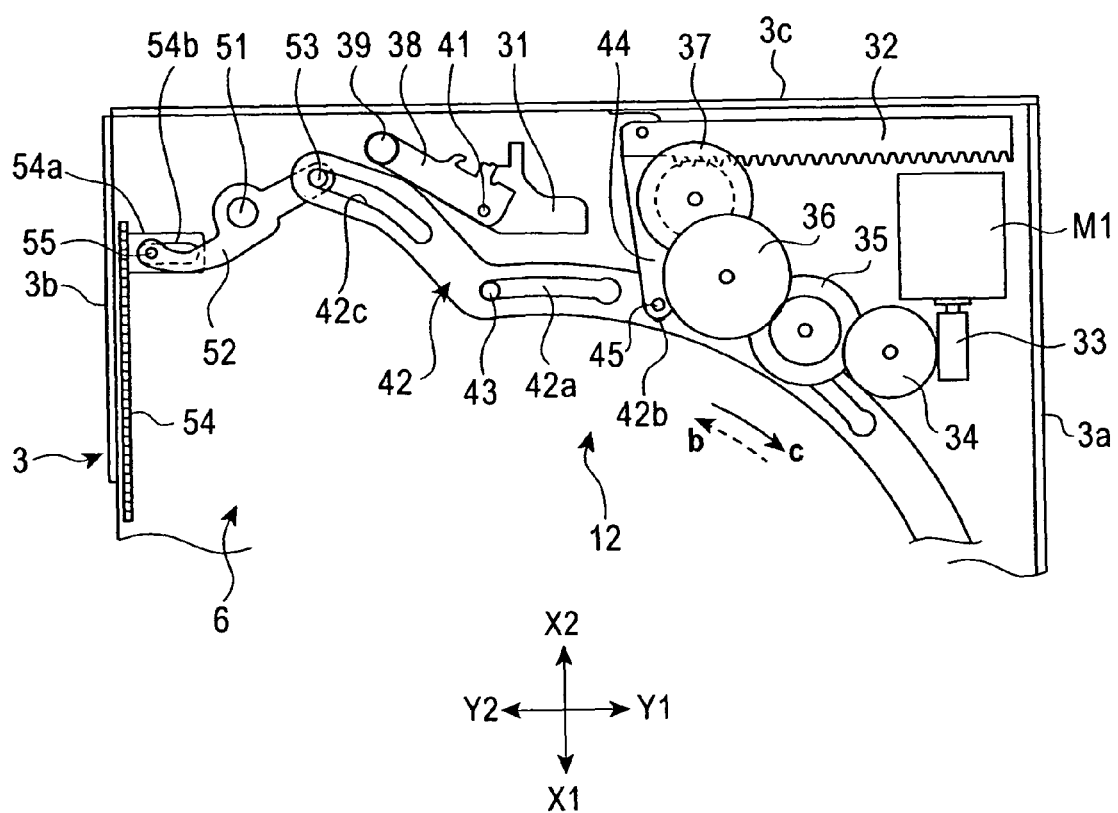

As shown in FIGS. 3 through 5, the first motive power transmission mechanism 12 has provided on the base face 6 a slider 31 which linearly moves in the Y1-Y2 direction and a rack member 32 which moves the slider 31 via an unshown linking member. Fixed on the near side of the front face 7, on the base 6, is a first motor M1 which is the driving source of the first motive power transmission mechanism 12. A worm gear 33 is fixed on the output shaft of the first motor M1. The rotational force of the first motor M1 is transmitted to a pinion gear 37 via reduction gears 34, 35, and 36. The pinion gear 37 meshes with the teeth of the rack member 32.

A switchover lever 38 is provided upon the slider 31. The far end (at the Y2 side) of the switchover lever 38 is turnably supported on the slider 31 by a shaft 39. A switchover driving pin 41 protrudes upwards at the near end (Y1 side) of the switchover lever 38. An attitude control pin extending downward concentrically with the switchover driving pin 41 is provided on the switchover lever 38. The attitude control pin is inserted into an unshown cam groove formed on the base face 6. When the switchover lever 38 moves in the Y1 direction along with the slider 31, the position and attitude of the switchover lever 38 is controlled following the shape of the cam groove.

Figure 10:
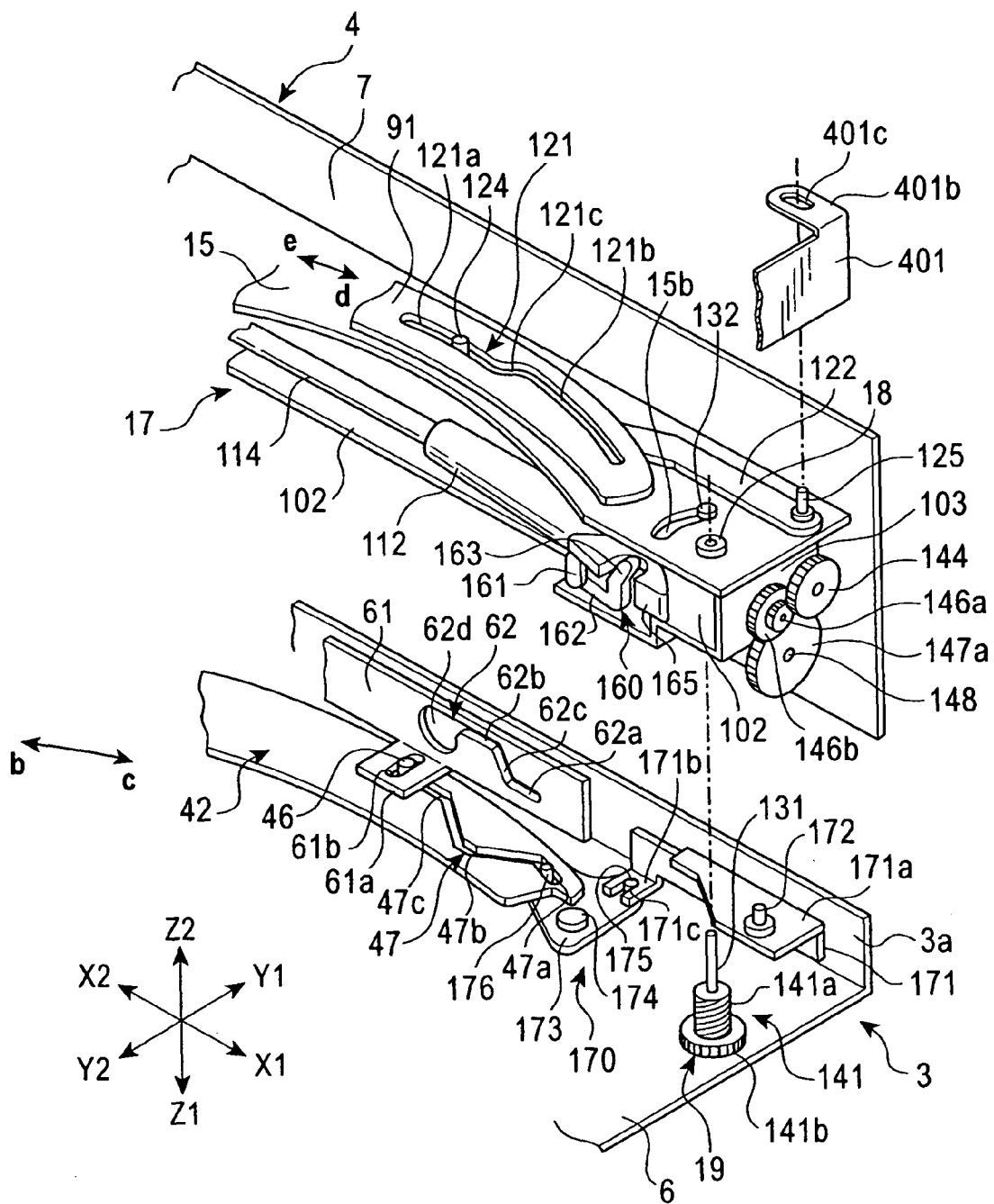
FIG. 10 is a partial perspective view of one embodiment of a first motive force transmission mechanism, a second motive force transmission mechanism and a third motive force transmission mechanism disposed on an inner side of a front face of the casing, seen from the inner side of the casing.

A lock switchover member 42 is provided on the base face 6. The lock switchover member 42 is a metal plate of which the planar shape has an arced form that is disposed from the inner side of the right side bent piece 3c of the lower portion casing 3, as shown in FIGS. 3 through 5. Across the inner side of the front side bent piece 3a of the lower portion casing 3, as shown in FIG. 10. In two places on a lock switchover member 42, two arc-shaped sliding slots 42a are formed thereupon. As also shown in FIG. 1, two guide pins 43 are erected on the base face 6, and each of the guide pins 43 are inserted into a sliding slot 42a. Sliding the sliding slots 42a over the guide pins 43 enables the lock switchover member 42 to be slid in a (b) direction, which is the counter-clockwise direction, when seen from above, and a (c) direction which is the clockwise direction, following an arc-shaped course.

A linking turning lever 44 is turnably supported on the base face 6. The linking turning lever 44 and the rack member 32 are lined via a cam unit (not shown), and the linking turning lever 44 is turned in the counter-clockwise direction in a two-stage action as the rack member 32 proceeds in the Y1 direction. A linking slot 42b is formed on the lock switchover member 42 extending on the width direction thereof, with a linking pin 45 formed on the tip of the linking turning lever 44 being inserted into the linking slot 42b. As shown in FIG. 5, the turning force of the linking turning lever 44 turns the lock switchover member 42 in the (c) direction when the moving force of the rack member 32 turns the linking turning lever 44 in the counter-clockwise direction in the Y1 direction.

A switchover slot 42c is formed at the end of the lock switchover member 42 at the far end (Y2 side). A transmission member 52 turnably supported by a shaft 51 is provided at the far side of the base face 6. A linking pin 53 is fixed on the near side end of the transmission member 52, and the linking pin 53 is inserted into the switchover slot 42c.

As shown in FIG. 1, a locking member 54 is provided on the inner side of the back bent piece 3b which functions as a vertical movement switching member. The locking member 54 is plate shaped, and is supported so as to be capable of linear motion in the X1-X2 direction on the inner side of the back bent piece 3b.

As shown in FIGS. 1 and 3, the locking member 54 is provided with a bent piece 54a bent from the lower edge thereof toward the base face 6. A slot 54b is formed in the bent piece 54a. A linking pin 55 is fixed on the far end of the transmission member 52, and the linking pin 55 is inserted in the slot 54b. At the time of the lock switchover member 42 moving from the position shown in FIG. 4 in the (c) direction, the transmission member 52 is turned in the counter-clockwise direction by the switchover slot 42c, thereby moving the locking member 54 in the X1 direction.

As shown in FIG. 1, the locking member 54 has opened therein a lock control hole 56. The lock control hole 56 has a restricting portion 56a formed at a position approaching the base face 6 at the X1 side a raising portion 56b which is positioned further toward the X2 side from the restricting portion 56a and which is positioned above the restricting portion 56a; and an inclined portion 56c interconnecting the restricting portion 56a and the raising portion 56b. Further, a relatively large-sized circular escape hole 56d is formed at the X2 side end of the raising portion 56b.

As shown in FIG. 10, a lock member 61 functioning as a rising/lowering switchover member is provided on the inner side of the front side bent piece 3a of the lower portion casing 3. The lock member 61 is supported so as to be slidable between X1 and X2 on the inner side of the front side bent piece 3a. A driving pin 46 is fixed on the lock switchover member 42 so as to protrude in the upper direction. A bent piece 61a is formed on the lower end of the lock member 61 so as to extend in the Y2 direction. The driving pin 46 is inserted into the slot 61b formed on the bent piece 61a. Note that the lock member 61 is also illustrated in FIG. 2B. As shown in FIGS. 1 and 3, when the lock switchover member 42 moves in the (b) direction, the locking member 61 is positioned at the X2 side as shown in FIGS. 2B and 10. When the lock switchover member 42 moves in the (c) direction, the locking member 61 moves in the X1 direction.

As shown in FIGS. 2B and 10, the locking member 61 has opened therein a pair of lock control holes 62. The lock control holes 62 each have a restricting portion 62a formed at a position approaching the base face 6 at the X1 side, a raising portion 62b which is positioned further toward the X2 side from the restricting portion 62a and which is positioned above the restricting portion 62a, and an inclined portion 62c interconnecting the restricting portion 62a and the raising portion 62b. Further, a relatively large-sized circular escape hole 62d is formed at the X2 side end of the raising portion 62b.

Now, description will be made regarding the actions of the first motive power transmission mechanism 12. As shown in FIGS. 1 through 3, when the rack member 32 has moved to the starting end at the far side (Y2 side), the slider 31 and the switchover lever 38 are positioned at the Y2 side. Additionally, the linking turning lever 44 has turned in the clockwise direction and the lock switchover member 42 has moved in the (b) direction. The locking member 54 shown in FIG. 1 and the locking member 61 shown in FIGS. 2B and 10 have both moved to the X2 side.

While the rack member 32 is moved from the position shown in FIG. 3 in the Y1 direction up to the position shown in FIG. 4 by the motive force of the first motor M1, the slider 31 and the switchover lever 38 move together with the rack member 32 in the Y1 direction in the drawing, and at the final step thereof, the switchover lever 38 is turned somewhat clockwise. However, while the rack member 32 is moving from the position in FIG. 3 to the position shown in FIG. 4, the linking turning lever 44 is not turned. The lock switchover member 42 is stopped at the position moved in the (b) direction and does not move in the (c) direction.

When the rack member 32 moves by a short distance in the Y1 direction from the position shown in FIG. 4, the slider 31 and the switchover lever 38 do not move from the position shown in FIG. 4, due to the controlling actions of an unshown linking member linking the slider 31 and the rack member 32 and the controlling actions of an unshown cam groove formed in the base face 6. The linking turning lever 44 is turned in the counter-clockwise direction and the lock switchover member 42 is moved in the (c) direction so that the locking member 54 and the locking member 61 are moved in the X1 direction by a distance equivalent to approximately half the overall movement range.

Prior to the rack member 32 moving in the Y1 direction and reaching the position shown in FIG. 5. In the linking turning lever 44 does not turn and the slider 31 and the switchover lever 38 moves in the Y1 direction. However, after this step, the slider 31 and the switchover lever 38 do not move in the Y1 direction and the linking turning lever 44 in the counter-clockwise direction. Further, as shown in FIG. 5, the lock switchover member 42 is slid in the (c) direction. Upon the lock switchover member 42 turning in the direction shown in FIG. 5, the locking member 54 is moved to the final position in the X1 direction. The locking member 61 is also moved to the final position in the X1 direction. Prior to the lock switchover member 42 reaching the position shown in FIG. 5, the switchover lever 38 on the slider 31 is turned by a great amount in the clockwise direction when seen from above.

Unit Supporting Base and Driving Unit

The unit supporting base 13 shown in FIG. 1 is formed by bending a metal plate. A front bent piece 13a is provided on the near side of the unit supporting base 13, with this front bent piece 13a being disposed parallel to the inner side of the front bent piece 3a of the lower casing 3. A back bent piece 13b is provided on the unit supporting base 13, with this back bent piece 13b being disposed parallel to the inner side of the back bent piece 3b of the lower casing 3. Additionally, a side bent piece 13c of the unit supporting base 13 is disposed parallel to the inner side of the right side bent piece 3c of the lower casing 3.

Figure 7:
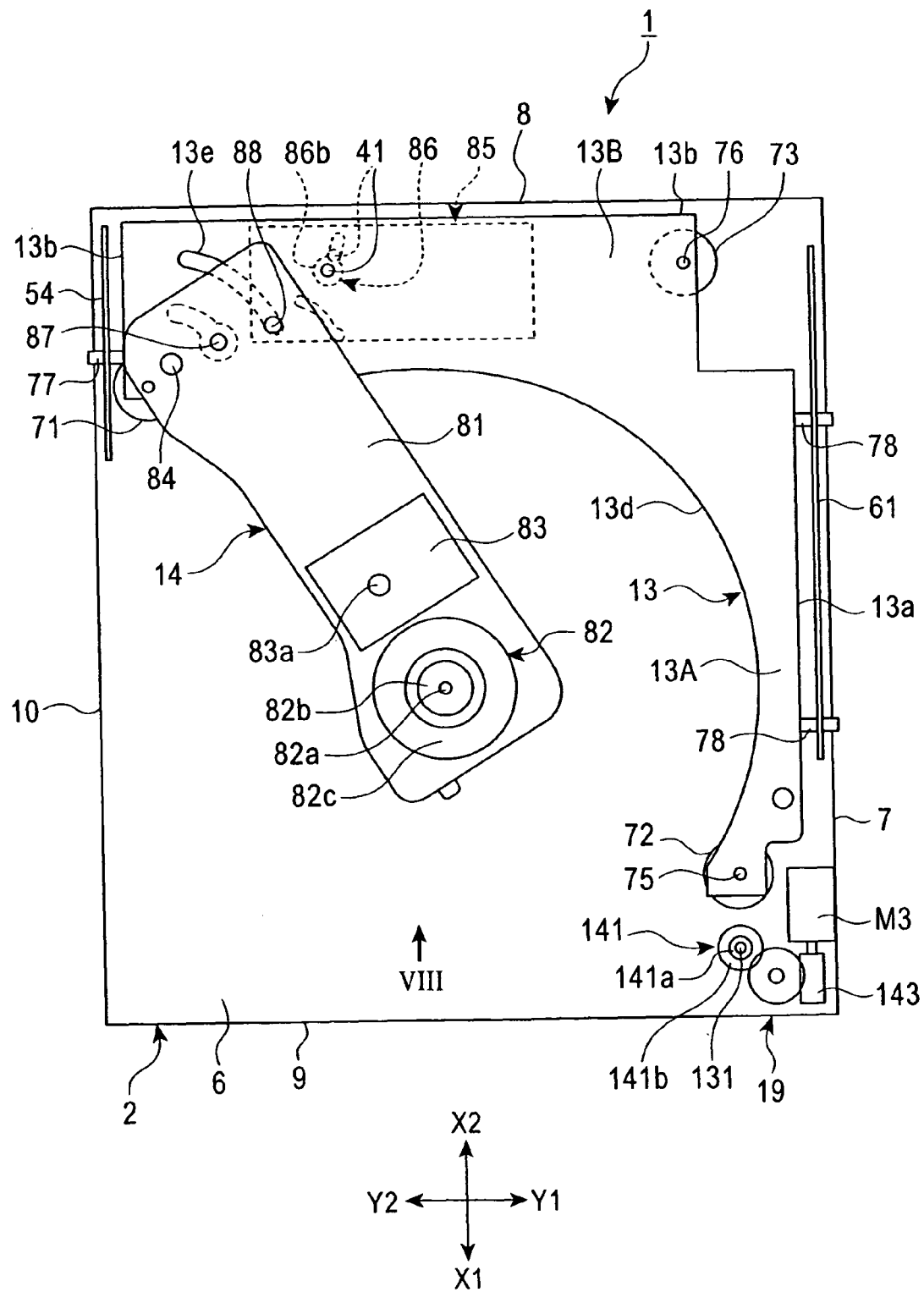

As shown in FIGS. 6 and 7, an inner edge 13d of the unit supporting base 13 is formed in a recessed arc shape, with the inner edge 13d being at a position slightly away towards the outside from the perimeter of a disk D supported by a supporting member 21 in the disk storing region 20 shown in FIG. 1.

As shown in FIGS. 1, 6, and 7, dampers 71, 72, and 73, which are elastic supporting members, are fixed at three positions on the base face 6 of the lower casing 3. The dampers 71, 72, and 73 are formed by a liquid such as oil or the like, or a gas, being sealed within a flexible pouch formed of rubber of the like. Alternatively, a compression coil spring may be used in combination with the pouch.

As shown in FIGS. 6 and 7, supporting shafts 74, 75, and 76 are vertically fixed at three positions on the base face of the unit supporting base 13 extending downwards. The supporting shaft 74 is supported by the damper 71, the supporting shaft 75 by the damper 72, and the supporting shaft 76 by the damper 73. The unit supporting base 13 can be elastically supported above the base face 6 by the dampers 71, 72, and 73.

A restricting shaft 77 protruding in the Y2 direction is provided on the back bent piece 13b of the unit supporting base 13. The restricting shaft 77 is inserted into the lock control hole 56 of the locking member 54 shown in FIG. 1. A pair of restricting shafts 78 protruding in the Y1 direction is provided on the front bent piece 13a of the unit supporting base 13. Each of the restricting shafts 78 is inserted into the lock control holes 62 of the locking member 61 shown in FIGS. 2B and 10.

As shown in FIGS. 6 and 7, the driving unit 14 has a slender driving base 81. A supporting shaft 84 vertically protrudes upwards at the far side (Y2 side) of the unit supporting base 13. The driving base 81 is supported by the supporting shaft 84 such that the driving unit 14 is capable of turning along the X-Y plane.

The turning range of the driving unit 14 is from the retracted position shown in FIG. 6 to the intervention position shown in FIGS. 7 and 19 through 22. As shown in FIG. 6, when that the driving unit 14 is at the retracted position, a turntable 82 which is a rotational driving unit situated on the turning end of the driving unit 14 is situated at the front face 7 side of the casing 2. The side of the driving base 81 is situated so as to be parallel with the right side face 8 of the casing 2 in close proximity therewith. The driving unit 14 in the retracted position is slightly away from the perimeter of the disk D supported by the supporting member 21 in the disk storage region 20.

As shown in FIGS. 7 and 19 through 22, upon the driving unit 14 turning to the intervention position, the turntable 82 moves to within the disk storage region 20. At this intervention position, the rotational center of the turntable 80 moves to the selection position (a) and matches the center hole of the disk D supported by the supporting member 21 beneath the center hole of the disk D.

As shown in FIG. 6, an arc guide portion 13e formed in an arc shape with a predetermined radius centered on the supporting shaft 84 is provided on the unit supporting base 13. The arc guide portion 13e is an arc-shaped slot which penetrates the unit supporting base 13. Additionally, a driving shaft 88 is vertically fixed on the lower face of the driving base 81 of the driving unit 14, and the driving shaft 88 is movably inserted into the arc guide portion 13e.

As shown in FIG. 6, a driving slider 85, which is a driving member, is provided on the lower face of the unit supporting base 13. The driving slider 85 is slidably supported so as to move in the Y1-Y2 direction. A drive hole 86 and an escape portion 86b connected to the drive hole 86 are formed on the drive slider 85. A switchover driving pin 41 fixed onto a switchover lever 38 of the first motive force transmission mechanism 12 is inserted in the drive hold 86. The drive slider 85 is moved in the Y1 direction by the switchover driving pin 41 when the switchover lever 38 moved in the Y1 direction.

An unshown driving link mechanism for driving the driving shaft 88 is disposed between the driving slider 85 and the unit supporting base 13. During the driving slider 85 moving from the starting end at the Y2 side shown in FIG. 2 toward the Y1 direction to the position shown in FIG. 4, the driving link mechanism presses the driving shaft 88 in the clockwise direction. Additionally, the driving unit 14 is turned from the retracted position shown in FIG. 6 to the intervention position shown in FIG. 7.

A spindle motor is disposed on the turning end of the driving base 81 of the driving unit 14, with the turntable 82 fixed to a motor shaft 82a of the spindle motor. As shown in FIG. 1, the turntable 82 has a center protrusion portion 82b which enters a center hole Da of the disk D, and a flange portion 82c extending from the center protrusion portion 82b toward the perimeter. A clamp mechanism is disposed within the turntable 82. The clamp mechanism has clamping claws radially protruding from the center protrusion portion 82b. The clamping claw is in a non-clamping mode when the clamping claws are retracted within the center protrusion portion 82b. In this state, the center protrusion portion 82b can enter the center hole Da of the disk D. The clamping claw is in a clamping mode when the clamping claws protrude from the center protrusion portion 82b. In this state, the perimeter of the center hole Da of the disk D is clamped between the clamping claws and the flange portion 82c, so that the disk D is clamped to the turntable 82.

The driving base 81 of the driving unit 14 has a clamping switchover mechanism for operating the clamping claws. Following the rack member 32 moving to the position shown in FIG. 4 and the driving unit 14 moving to the intervention position, the rack member 32 moves in the Y1 direction and the driving slider 85 moves in the Y1 direction. The driving force of the rack member 85 and driving slider 85 operates the clamping switchover mechanism such that the clamping claws are switched from the non-clamping mode to the clamping mode.

As shown in FIGS. 6 and 7, an optical head 83 is provided to the driving base 81, with an object lens 83a disposed on the upper face of the optical head 83. A thread mechanism is provided on the driving base 81, which acts to move the optical head 83 from a position near the turntable 82 to a position away from the turntable 82. At this time, the object lens 83a of the optical head 83 can move in the radial direction of the disk D clamped to the turntable 82.

Second Motive Power Transmission Mechanism

Next, the second motive power transmission mechanism 16 provided on the middle casing 4 will be described with reference to FIGS. 8 and 9.

With the second motive power transmission mechanism 16, an arc-shaped switchover member 91 is provided above the mechanism base 15 of the middle casing 4. The switchover member 91 has formed thereupon a pair of guide slots 91a which extend following an arc course. A pair of guide shafts 92 is fixed protruding upwards from the mechanism base 15, with each of the guide shafts 92 being inserted in a respective guide slot 91a. The supporting mechanism allows the switchover member 91 to be slidably guided in the (d) direction and the (e) direction following the arc course. Further, rack teeth 91b are formed following the arc course on the edge of the perimeter of the switchover member 91.

The mechanism base 15 is positioned at a height in the middle of the vertical movement region of the supporting unit 21 within the disk storage region 20. The switchover member 91 is positioned at a height in the middle of the vertical movement region of the supporting unit 21. The switchover unit 91 moves along an arc-shaped course following the perimeter of the disk on the outer side of the peripheral side of the disk D stored in the disk storage region 20.

A second motor M2 is provided on the mechanism base 15. A worm gear 93 is fixed on the rotational shaft of the second motor M2. An output gear 94 is provided on the mechanism base 15 that meshes with the worm gear 93.

The rotational motive force of the second motor M2 is output from the output gear 94 and transmitted to a pinion gear 97 via a first switchover gear 95 and a gear 96. The first switchover gear 95 can be switched between a position of meshing with the output gear 94 and a position disengaged from the output gear 94. The pinion gear 97 meshes with rack teeth 91*b* of the switchover member 91. A second switchover gear 98 is provided to the side of the output gear 94. The second switchover gear 98 is for transmitting motive force of the second motor M2 to the supporting member selecting mechanism 22 shown in FIG. 1. When the first switchover gear 95 is engaged with the output gear 94, the second switchover gear 98 is disengaged from the output gear 94. When the first switchover gear 95 is disengaged from the output gear 94, the second switchover gear 98 engages with the output gear 94.

Figure 9:
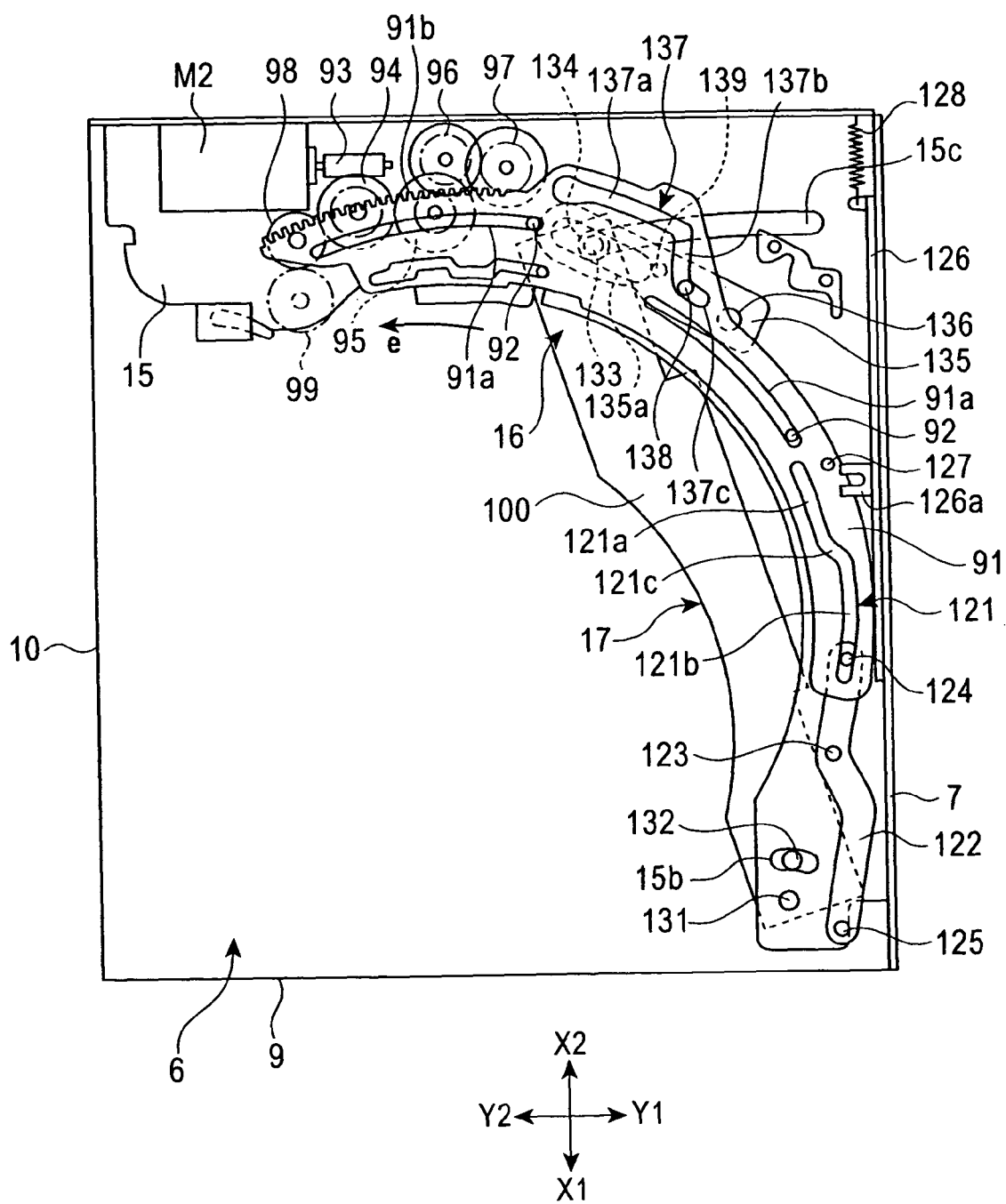
Figure 11:
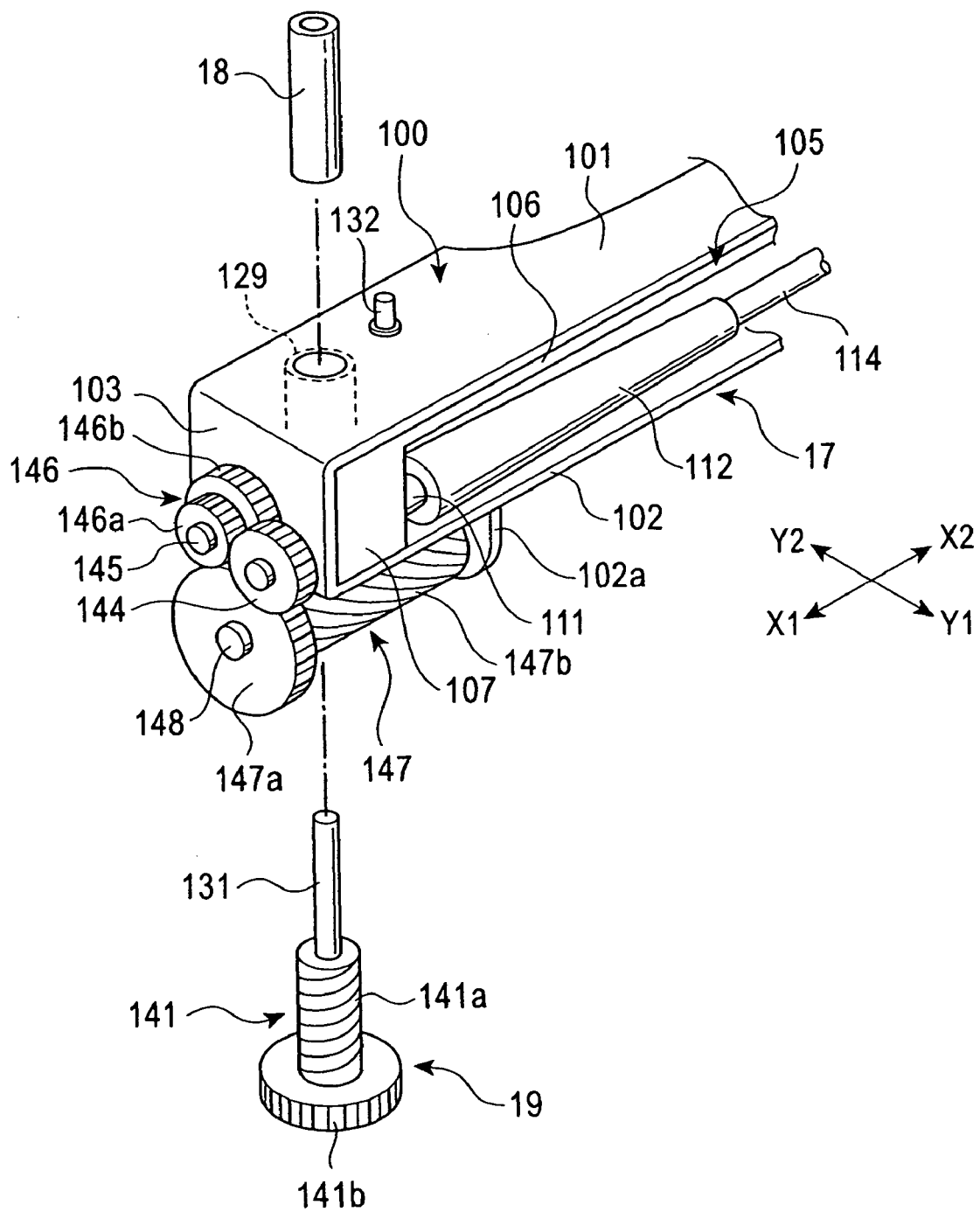
FIG. 11 illustrates one embodiment of the third motive force transmission mechanism, and in particular, is a disassembled perspective view illustrating the configuration of a turning pivot of the transporting unit from a direction opposite that of FIG. 10.

As shown in FIGS. 1, 8, and 9, the transporting unit 17 is provided below the mechanism base 15. As shown in FIGS. 2A, 10, and 11, the transporting unit 17 has a metal unit frame 100 which is slender and extends in the X1-X2 direction. As shown in detail in FIG. 11, the unit frame 100 has an upper face 101, lower face 102, fulcrum-side side face 103, and free-side side face 104, with the inside of the unit frame 100 being open in the Y1-Y2 direction. A sliding member 105 formed of a synthetic resin having a low friction coefficient is provided within the unit frame 100. The sliding member has a nipping portion 106 extending along the upper face 101 of the unit frame 100, a side guide portion 107 positioned on the inner side of the fulcrum-side side face 103, and a side guide portion 108 positioned on the inner side of the free-side side face 104. The gap between the side guide portion 107 and the side guide portion 108 facing one another is wider than the diameter of the disk D and is approximately the same or slightly greater than the opening width dimensions W of the insertion opening 23, as shown in FIG. 2A.

As shown in FIGS. 19 through 22, the transporting unit 17 has a roller shaft 111 provided within the unit frame 100. The roller shaft 111 extends in parallel with the upper face 101 of the unit 100, and is rotatably supported by the fulcrum-side side face 103 and the free-side side face 104 at the both ends thereof. Provided on the perimeter of the roller shaft 111 are a first transporting roller 112 and a second transporting roller 113. Both the first and second transporting units 112 and 113 are formed of a material with a high friction coefficient such as synthetic rubber, natural rubber or the like. The first transporting roller 112 and second transporting roller 113 are provided with spacing therebetween in the axial direction. When the transporting unit 17 is in the standby position shown in FIGS. 19, 21, and 22, the first transporting roller 112 and second transporting roller 113 are approximately parallel to the front face 7 of the casing 2 and at positions equally distanced from the insertion center line Oa.

A middle portion 114 situated between the first transporting roller 112 and second transporting roller 113 provides no substantial transporting force to the disk D. The middle portion 114 is formed to be integral with the transporting rollers 112 and 113 and smaller that the transporting rollers 112 and 113. Alternatively, the middle portion 114 is formed where the roller shaft 111 is directly exposed.

As shown in FIGS. 2A and 11, the first transporting roller 112 and second transporting roller 113 face the nipping portion 106 of the sliding member 105. At least one of the transporting roller 112 and 113 and the nipping portion 106 is pressed by a spring, such that the transporting rollers 112 and 113 and the nipping portion 106 are elastically pressed against each other. The disk D can be nipped between the transporting roller 112 and the nipping portion 106, and the transporting roller 113 and the nipping portion 106. Note that in the pressed state, the space between the middle portion 114 and the nipping portion 106 is greater than the thickens dimension of the disk D, so the disk D is never nipped between the middle portion 114 and the nipping portion 106.

The first transporting roller 112 and second transporting roller 113 are rotatably passed over the perimeter of the roller shaft 111 without any adhesion to the perimeter of the roller shaft 111. When the nipping pressure as to the disk D is acting upon the transporting rollers 112 and 113, the friction between the transporting rollers 112 and 113 and the roller shaft 111 increases, such that the roller shaft 111 and the transporting rollers 112 and 113 rotate integrally. The arrangement is such that in the event that the disk D being nipped is grasped by human fingers, or in like cases wherein a large resistance force is applied to the disk D being transported, the roller shaft 111 slips with regard to the transporting rollers 112 and 113.

In one embodiment, the nipping portion 106 is formed of a synthetic resin material having a low friction coefficient, but in other embodiments the nipping portion may be a free-rotating roller.

The transporting unit 17 is arranged to turn from the standby position shown in FIGS. 8 and 19 to the transporting operation position shown in FIGS. 9 and 20, with the end at the X1 end in the drawing as a fulcrum. At the standby position, the unit frame 100 is slightly removed from the perimeter of the disk D supported by the supporting medium 21 in the disk storing region 20. As shown in FIG. 20, upon the transporting unit 17 turning in the counter-clockwise direction and reaching the transporting operation position, a transporting center line Ob, which is an imaginary line passing through the center point between the transporting rollers 112 and 113 and extending perpendicularly to the axial line of the transporting rollers 112 and 113, passes through the disk storing region 20 having multiple supporting members 21.

As shown in FIGS. 1, 2A, 10, and 11, a reference shaft 131 serving as the pivot of the transporting unit 17 is fixed on the base face 6 of the lower casing 3 to extend upwards perpendicularly. As shown in FIG. 10, a hollow shaft 18 formed of metal in a cylinder shape is provided on the edge portion on the X1 side of the mechanism base 15 which is positioned on the inner side of the front face 7 of the middle casing 4. The upper edge of the hollow shaft 18 is fixed to the mechanism base 15 with a caulking means or welding means. The hollow shaft 18 is extended perpendicularly in the lower direction (Z1 direction) of the mechanism base 15.

As shown in FIG. 11, a bearing 129 extending in a direction orthogonal to the roller shaft 111 on the edge portion of the X1 side is provided on the transporting unit 17, such that the bearing 129 passes over the hollow shaft 18 so as to be turnable. Upon the lower casing 3 being fit together with the middle casing 4, the reference shaft 131 affixed to the base face 6 of the lower casing 3 is inserted into the hollow shaft 18. As a result, with the transporting unit 17, the bearing portion 129 and the hollow shaft 18 slide rotate between the standby position and the transfer operation position, with the reference shaft 131 at the center. The lower casing 3 and the middle casing 4 are positioned and fit together with the reference shaft 131 affixed to the lower casing 3 as a reference.

With the second motive power transmission mechanism 16 shown in FIGS. 8 and 9, an arc-shaped guide hole 15*b* is opened in the X1 side of the mechanism base 15 of the middle casing 4 and another arc-shaped guide hole 15*c* is opened in the X2 side as well. The guide hole 15*b* and the guide hole 15*c* both follow arc courses centered on the reference shaft 131.

On the upper face 101 of the unit frame 100 of the transporting unit 17, a guide shaft 132 extending perpendicularly upwards is fixed at a position near to the reference shaft 131.

The free end side of the reference shaft 131 has a driving shaft 133 extending perpendicularly upwards in the same way. As shown in FIGS. 8 and 9, the guide shaft 132 is passed through the guide hole 15b from the bottom upwards. The driving shaft 133 is also passed through the guide hole 15c from the bottom upwards. The tip of the driving shaft 133 protrudes upwards from the mechanism base 15, and a turning ring 134 is turnably provided on the driving shaft 133.

A driving lever 135 is provided on the mechanism base 15. The base of this driving lever 135 is turnably supported on the mechanism base 15 via a shaft 136. The driving lever 135 has opened therein a driving slot 135a, and the turning ring 134 provided on the perimeter of the driving shaft 133 is inserted inside the driving slot 135a.

The switchover member 91 provided on the mechanism base 15 has opened therein a unit control slot 137. A transmission shaft 138 protrudes perpendicularly on the upper face of the driving lever 135, and the transmission shaft 138 is inserted into the unit control slot 137 from the bottom upwards.

A non-acting portion 137a is formed in the unit control slot 137. The non-acting portion 137a is formed following an arc course, the center of curvature of which is the center of curvature of the arc course of the switchover member 91 sliding in the (d)-(e) directions. As shown in FIG. 8, when the transmission shaft 138 is positioned within the non-acting portion 137a, even when the switchover member 91 slides in the (d)-(e) direction, the moving force thereof does not act upon the transmission shaft 138.

With the unit control slot 137, a driving inclined portion 137b is provided continuing from the Y1 side of the non-acting portion 137a. A holding portion 137c is formed at the end on the Y1 side. The holding portion 137c is positioned further toward the center of curvature of the sliding course of the switchover member 91 than the non-acting portion 137a.

While the switchover member 91 slides toward the (e) direction from the position shown in FIG. 8 to reach the position shown in FIG. 9, the transmission shaft 138 makes transmission to the driving inclined portion 137b. At this time, the driving inclined portion 137b moves the transmission shaft 138 in the counter-clockwise direction, and the driving lever 135 is turned in the counter-clockwise direction. The driving shaft 133 is pressed in the counter-clockwise direction by the driving slot 135a of the driving lever 135, and the transporting unit 17 turns in the counter-clockwise direction with the reference shaft 131 as its fulcrum, to reach the transporting operation position. Upon the switchover member 91 moving further in the (e) direction, as shown in FIG. 9, the driving shaft 133 reaches the Y2 end potion of the guide hole 15c, and the transmission shaft 138 is held at the holding portion 137c of the unit control slot 137 so that the transporting unit 17 is restricted at the transporting operation position.

In one embodiment, the unit control slot 137 provided in the switchover member 91 and the driving lever 135 comprise the transporting unit turning means.

As shown in FIGS. 8 and 9, a switchover slot 121 is formed at the Y1 side and X1 side end of the switchover member 91. The switchover slot 121 has a first arc portion 121a; a second arc portion 121b extending in the (d) direction, situated further outside from the first arc portion 121a; and a switchover portion 121c connecting the arc portions 121a and 121b. The center of curvature of the first arc portion 121a and the second arc portion 121b matches the center of curvature of the arc courses of the guide slots 91a.

A switchover lever 122 is provided at the Y1 side of the mechanism base 15 at the edge thereof. The switchover lever 122 is positioned between the mechanism base 15 and switchover member 91, and is turnably supported by a supporting shaft 123 fixed on the upper face of the mechanism base 15. A control pin 124 is fixed at the end of the switchover lever 122 on the X2 side. The control pin 124 is slidably inserted into the switchover slot 121 formed on the switchover member 91. A switchover pin 125 is fixed on the X1 side end of the switchover lever 122. As described below, the operation of the restriction guide switchover function provided on the inner side of the left side face 9 of the upper casing 5 is switched with the switchover pin 125.

As shown in FIGS. 8 and 9, a shutter opening/closing member 126 is provided on the inner side of the front face 7 of the casing 2. The shutter opening/closing member 126 is formed of a metal plate, and is supported on the inner side of the front face 7 so as to be slidable in the X1-X2 direction. The shutter opening/closing member 126 is pulled in the X2 direction by a pulling coil spring 128. Provided to the shutter opening/closing member 126 is a driving piece 126a bent from the lower edge in the Y2 direction. A driving pin 127 is fixed on the switchover member 91, and as shown in FIG. 8, the driving pin 127 can be inserted into a groove formed on the driving piece 126a.

In FIG. 8, the transmission shaft 138 provided on the driving lever 135 is positioned within the non-acting portion 137a of the unit control slot 137, formed on the switchover member 91. The transporting unit 17 has turned in the clockwise direction and is at the standby position. The control pin 124 provided to the switchover lever 122 is positioned within the first arc portion 121a of the switchover slot 121, and the switchover lever 122 has turned in the counter-clockwise direction with the switchover pin 125 having moved to the Y1 side. The driving pin 127 provided to the switchover member 91 is in the groove of the driving piece 126a, and the shutter opening/closing member 126 has moved in the X1 direction.

When the switchover member 91 moves from the position shown in FIG. 8 in the (e) direction, prior to the transmission shaft 138 entering the driving inclined portion 137b of the unit control slot 137, the control pin 124 provided on the switchover lever 122 enters the second arc portion 121b of the switchover slot 121, the switchover lever 122 turns in the clockwise direction, and the switchover pin 125 moves in the Y2 direction. At this time, the shutter opening/closing member 126 is moved in the X2 direction by the driving pin 127 provided on the switchover member 91.

The movement in the (e) direction of the switchover member 91 inserts the transmitting shaft 138 in the driving inclined portion 137b of the unit control slot 137. As shown in FIG. 9, the transporting unit 17 rotates in the counter-clockwise direction and arrives at the transfer operation position.

Shutter Opening/Closing Mechanism

FIGS. 18A and 18B are perspective views illustrating one embodiment of a shutter opening/closing mechanism 200 from the front side of the front face 7 of the casing 2.

The shutter 201 is formed of a thin metal plate, having a rectangular shape which is slender in the X1-X2 direction, and has enough area to cover the insertion opening 23 formed on the front face 7 of the casing 2. Sliding pins 203 are fixed on the upper end of the shutter 201 on the Z2 side with spacing therebetween in the X1-X2 direction. Sliding slots 7a are formed on the front face 7 of the casing 2 that extend linearly in the vertical direction. The sliding pins 203 are inserted into the sliding slots 7a such that the shutter 201 is supported vertically movable while being in contact with the surface of the front face 7.

Opening/closing cams 202 are formed on the shutter opening/closing member 126. The opening/closing cams 202 are cam grooves penetrating the shutter opening/closing member 126. Each of the opening/closing cams 202 has a closing portion 202a extending linearly in the X2 direction, an opening portion 202b extending linearly in the X1 direction higher than the closed portion 202a, and an inclined switchover portion 202c connecting the closing portion 202a and the opening portion 202b.

As shown in FIG. 8, when the switchover member 91 of the second motive power transmission mechanism 16 is positioned in the (d) direction, the shutter opening/closing member 126 has been moved to the X1 side by the driving pin 127. At this time, as shown in FIG. 18A, the sliding pins 203 are pressed down by the closing portions 202a of the opening/closing cams 202 formed on the shutter opening/closing member 126 so that the shutter 201 descends and the insertion opening 23 is closed. As shown in FIG. 9, upon the switchover member 91 moving in the (e) direction, the shutter opening/closing member 126 is moved in the X2 direction by the driving pin 127 and the pulling coil spring 128. Additionally, the sliding pins 203 are pressed upwards by the opening portions 202b of the opening/closing cams 202 as shown in FIG. 18B so that the shutter 201 ascends and the insertion opening 23 is opened.

The opening/closing timing of the shutter 201 is described with reference to FIG. 8. When the transmission shaft 138 is positioned within the non-acting portion 137a of the unit control slot 137 and the switchover lever 122 is turned in the clockwise direction, the shutter 201 is closed. When the switchover member 91 moves in the (e) direction from the state shown in FIG. 8 and the transmission shaft 138 reaches the end of the non-acting portion 137a of the unit control slot 137 at the (d) side (the dividing portion between the non-acting portion 137a and the driving inclined portion 137b), the shutter 201 opens while the switchover lever 122 is turned in the counter-clockwise direction. Further, upon the switchover member 91 moving in the (e) direction, the transmission shaft 138 enters the driving inclined portion 137b of the unit control slot 137 and the transporting unit 17 turns toward the transporting operation position shown in FIG. 9. During this time, the shutter 201 remains open.

When the switchover member 91 moves from the position shown in FIG. 9 in the (d) direction, first, the transporting unit 17 turns in the clockwise direction to be restored to the standby position. Additionally, the transmission shaft 138 enters the non-acting portion 137a from the driving inclined portion 137b and the shutter 201 is closed.

Protrusion Supporting Member

Figure 17:
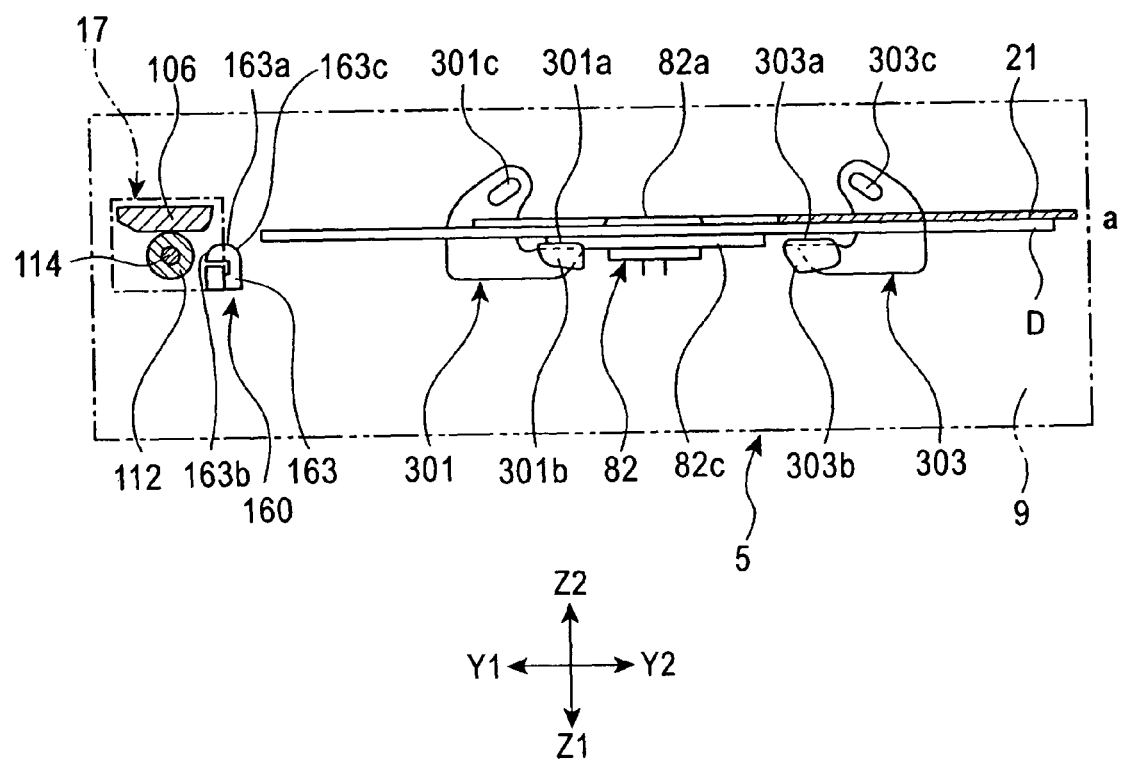
FIG. 17 is a partial side face view of the operation of one embodiment of the restriction guide switchover mechanism, seen from the inner side of the casing.

As illustrated in FIG. 10, a protrusion supporting member 160 which protrudes in the casing inner direction (Y2 direction) is provided on the edge portion of the X1 side of the transporting unit 17. The protrusion supporting member 160 is typically formed of a synthetic resin material. The protrusion supporting member 160 includes a shaft supporting portion 161, an arm portion 162 extending integrated from the shaft supporting portion 161, and a supporting portion 163 formed so as to be integrated with the tip portion of the arm portion 162, that extends in the upper direction (Z2 direction). As shown in FIG. 17, the upper face 163a of the supporting portion 163 is at a height that is the same as the lower face of the disk D held at the lower face of the supporting unit 21 of the selection position A. Alternatively, the upper face 163a is at a height that is slightly higher toward the Z2 side from the lower face of the disk D. FIGS. 12 through 15 illustrate one embodiment of the protrusion supporting member 160 as a plan view. The supporting portion 163 of the protrusion supporting member 160 is formed to be slender to extend in the Y1-Y2 direction when in the attitude shown in FIG. 12. The upper face 163a of the supporting member has an edge portion on the Y1 side is an inclined face 163b gradually descending in the lower direction (Z1 direction) as it progresses toward the Y1 direction. Similarly, the edge portion on the Y2 side is an inclined face 163c gradually descending in the lower direction (Z1 direction) as is progresses toward the Y2 direction.

Figure 12:
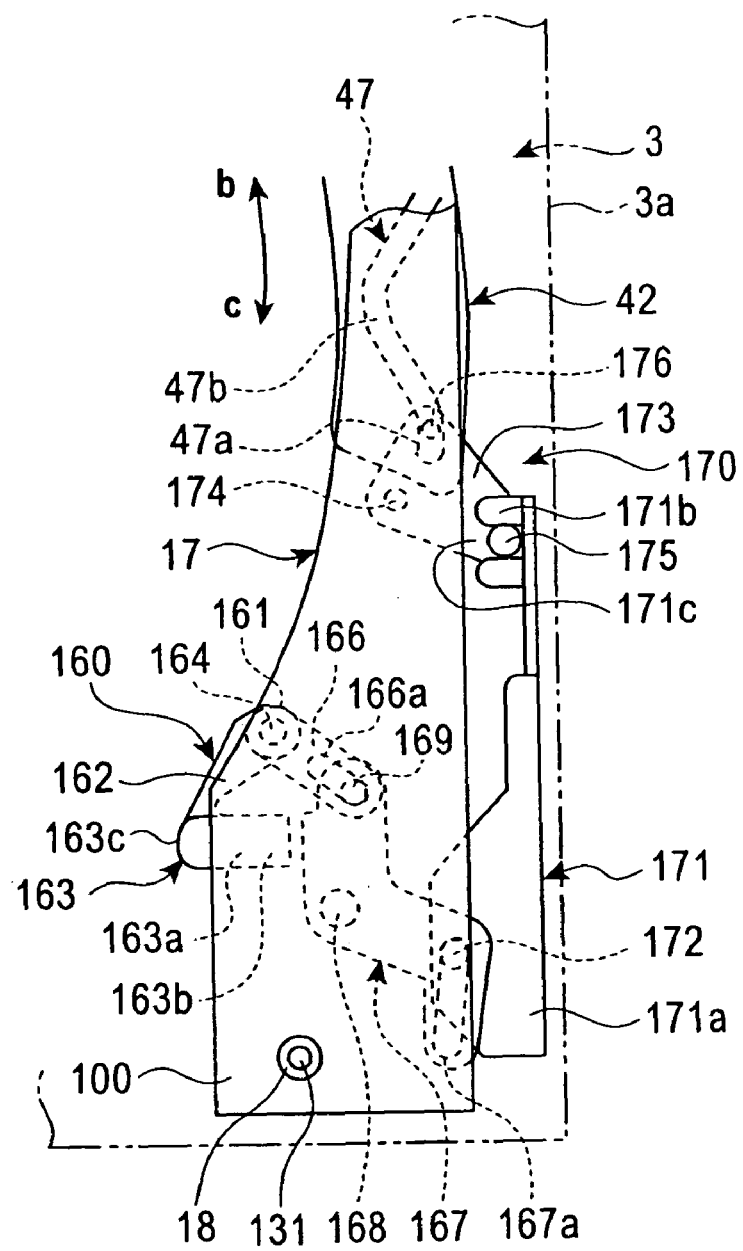
FIGS. 12 through 15 are partial plan view diagrams illustrating a portion of one embodiment of the transporting unit provided on the inner side of the front face of the casing, shown by operational function.
Figure 12:
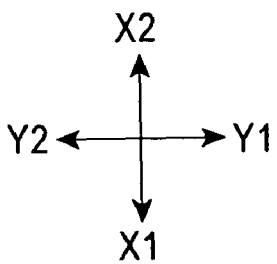

As shown in FIGS. 12 through 15, a supporting shaft 164 affixed facing the upper direction is provided on the lower face 102 of the unit frame 100 of the transporting unit 17, and the shaft supporting portion 161 of the protrusion supporting member 160 is turnably supported by the supporting shaft 164. An unshown torsion spring is provided on the supporting shaft 164, and the protrusion supporting member 160 is pulled continually toward the retracted position rotated thereto in a counter-clockwise direction as shown in FIG. 12. As shown in FIG. 10, a holder 165 made of synthetic resin is affixed to the lower face 102 of the unit frame 100. The recessed portion is formed on the holder 165 which recesses toward the Y1 direction. As shown in FIG. 12, when the protrusion supporting member 160 rotates in a counter-clockwise direction to arrive at the retracted position, the supporting portion 163 is placed in the recessed portion. The upper face of the holder 165 is formed to be at a position at the same height as the upper face 163a of the supporting portion 163, or at a position lower in the lower direction (Z1 direction) than the upper face 163a.

Figure 15:
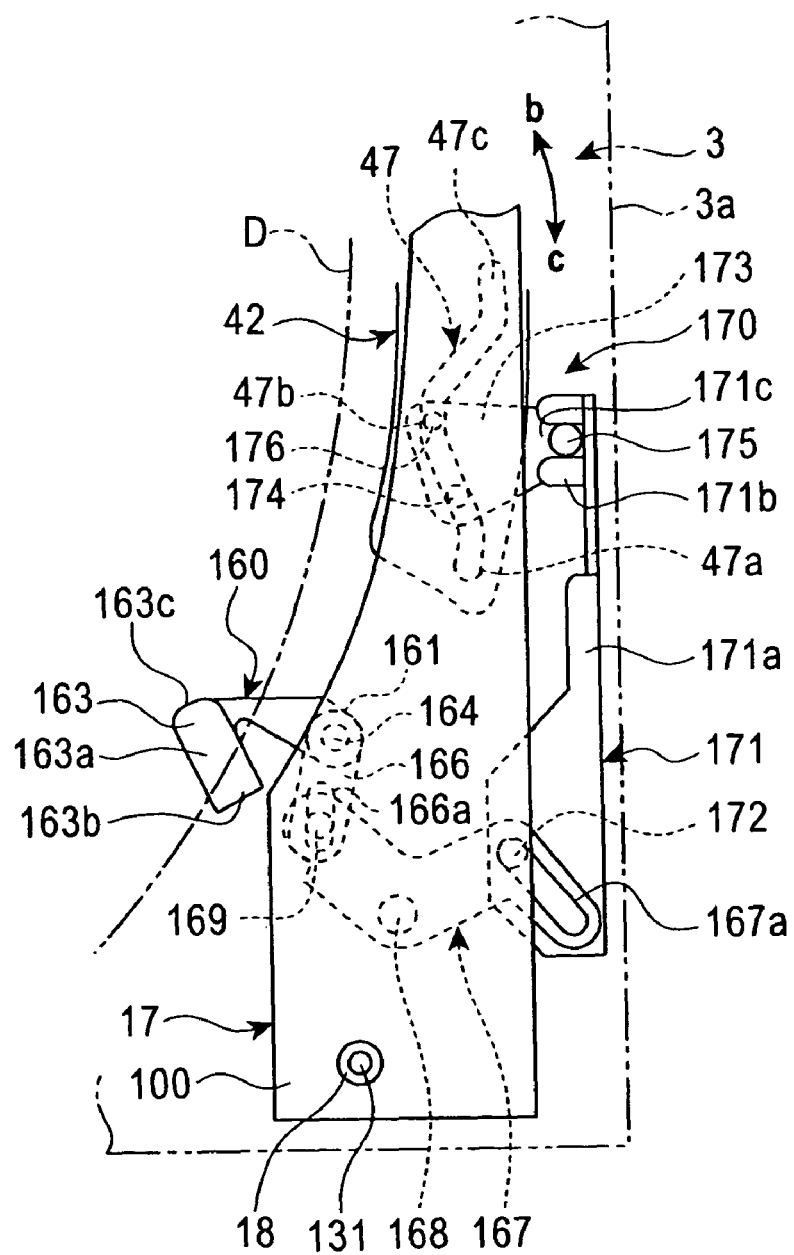

As shown in FIG. 12, a drive plate 166 made of metal is affixed on the lower face of the shaft supporting portion 161 of the protrusion supporting member 160. The drive plate 166 is arranged to be able to rotate while integrated with the protrusion supporting member 160. A control plate 167 is provided on the lower face 102 of the unit frame 100. The control plate 167 is turnably supported with the supporting shaft 168 affixed on the lower face 102 as the center. A linking pin 169 is affixed to the tip of the arm portion of one side of the control plate 167. The linking pin 169 is inserted in the slot 166a formed on the drive plate 166. An arc-shaped linking hole 167a is formed on the arm portion on the other side of the control plate 167. As shown in FIG. 15, when the control plate 167 rotates in the counter-clockwise direction in the transporting unit 17 and arrives at the rotation limit position therein, the center of curvature of the arc-shaped course of the arc-shaped linking hole 167a matches the axial center of the reference shaft 131 which is the rotation fulcrum of the transporting unit 17.

As shown in FIG. 10, the control switchover mechanism 170 which controls the attitude of the protrusion supporting member 160 is provided on the base face 6 of the lower casing 3.

A protrusion switchover member 171 is supported on the inner side of the front side bent piece 3a of the lower casing 3 so as to be slidable in the X1-X2 direction. The protrusion switchover member 171 includes a metal plate. An edge of the protrusion switchover member 171 includes a bent portion 171a which is bent towards the Y2 direction and a switchover pin 172 affixed facing upwards on the bent portion 171a. As shown in FIG. 12 the switchover pin 172 is inserted into the arc-shaped linking hole 167a of the control plate 167 provided on the transporting unit 17. A drive tab 171b which is bent along the base face 6 is provided on the edge portion on the X2 side of the protrusion switchover member 171. A linking slot 171c is formed on the drive tab 171b.

A linking member 173 is turnably supported on the base face 6 of the lower casing 3 by the shaft 174. A linking pin 175 is affixed on the edge portion on one side of the linking member 173. The linking pin 175 is inserted in the linking slot 171c. A control pin 176 is affixed facing upwards on the edge portion on the other side of the linking member 173.

A protrusion control slot 47 is formed on the edge portion on the X1 side of the lock switchover member 42 which configures the first motive force transmission mechanism 12. The protrusion control slot 47 includes a first retraction guide portion 47a that extends toward the (c) direction and is positioned on the side of the protrusion central slot 47 farther away from the center of curvature of the arc-shaped course of the lock switchover member 42. The protrusion central slot 47 additionally includes a protrusion guide portion 47b positioned more on the (b) side of the protrusion than the first central slot 47 retraction guide portion 47a and is positioned on the side close to the center of curvature. The protrusion central slot 47 further includes a second retraction guide portion 47c positioned more on the (b) side than the protrusion guide portion 47b and is positioned on the side of the protrusion central slot 47 farther away from the center of curvature. Between the first retraction guide portion 47a and the protrusion guide portion 47b is an inclination portion. Further, between the protrusion guide portion 47b and the second retraction guide portion 47c is an inclination portion.

With the above configuration, the attitude of the protrusion support member 160 loaded on the transporting unit 17 is synchronized with the operation of the locking member 61 and locking member 54, and the attitude of the protrusion support member 160 changes based on the operation of the lock switchover member 42.

FIGS. 10 and 12 show a state where the lock switchover member 42 has moved to the beginning edge toward the (b) direction, similar to FIGS. 3 and 4. When the locking member 61 moves toward the X2 side and the constraint shaft 78 provided on the unit supporting base 13 is positioned within the constraint portion 62a of the lock control hole 62 formed on the locking member 61, the unit supporting base 13 is lowered. At this time, the control pin 176 provided on the linking member 173 is positioned within the first retraction guide portion 47a of the protrusion control slot 47. Therefore, the linking member 173 rotates in a clockwise direction and the protrusion switchover member 171 moves in the X1 direction.

Figure 13:
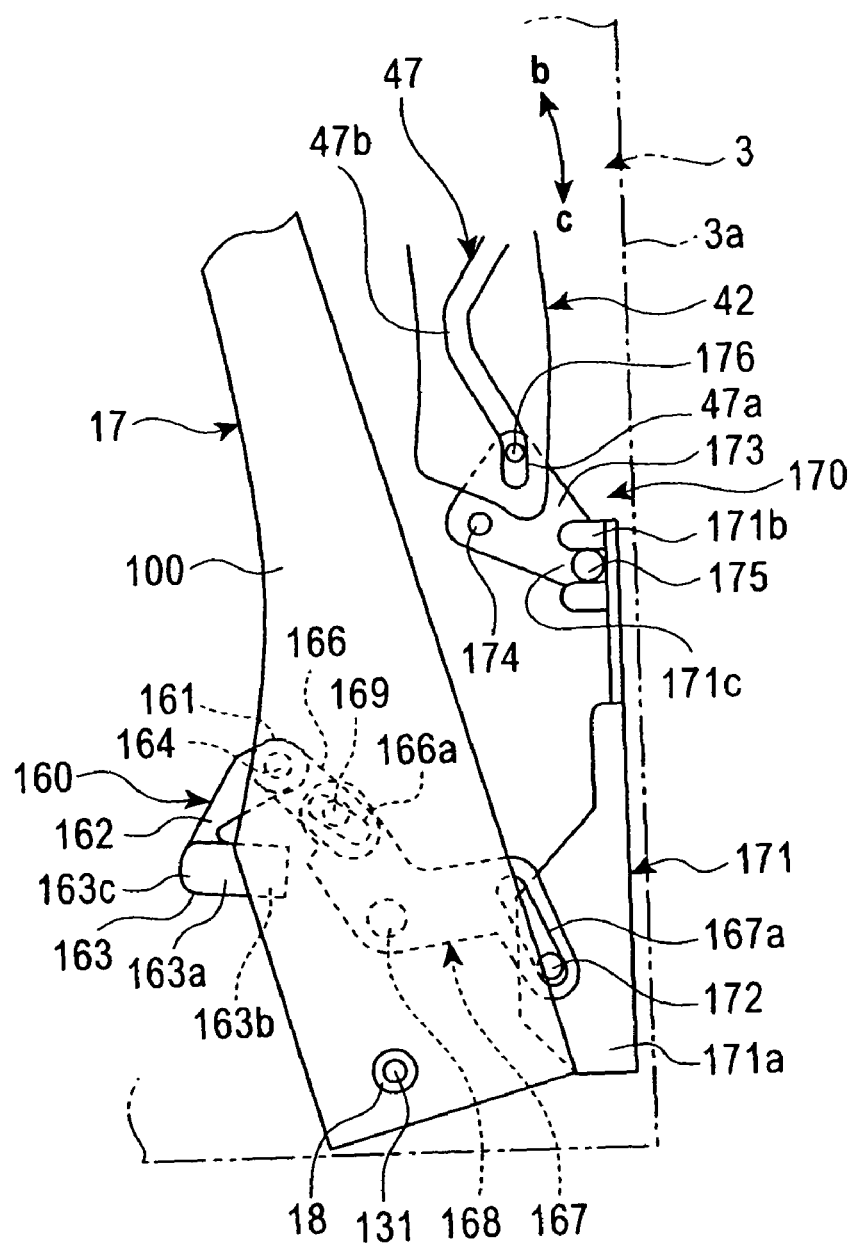
Figure 13:
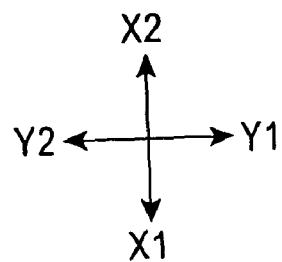

As shown in FIG. 12, if the protrusion switchover member 171 is in a state of moving in the X1 direction and the transporting unit 17 is in a standby position near the front face 7, the control plate 167 provided on the transporting unit 17 is rotated in a clockwise direction with the switchover pin 172 provided on the protrusion switchover member 171, the drive plate 166 and protrusion supporting member 160 are rotated in a counter-clockwise direction, and the supporting unit 163 is in a retracted position placed within the unit frame 100 of the transporting unit 17. As shown in FIG. 13, if the protrusion switchover member 171 is moving in the X1 direction and the transporting unit 17 rotates in a counter-clockwise direction to arrive at the transfer operation position, the control plate 167 constrained by the switchover pin 172 rotates in a counter-clockwise direction within the transporting unit, along with the rotation of the transporting unit 17, the protrusion supporting member 160 rotates in a clockwise direction, and the supporting member 163 protrudes from the transporting unit 17 in the Y2 direction.

Figure 14:
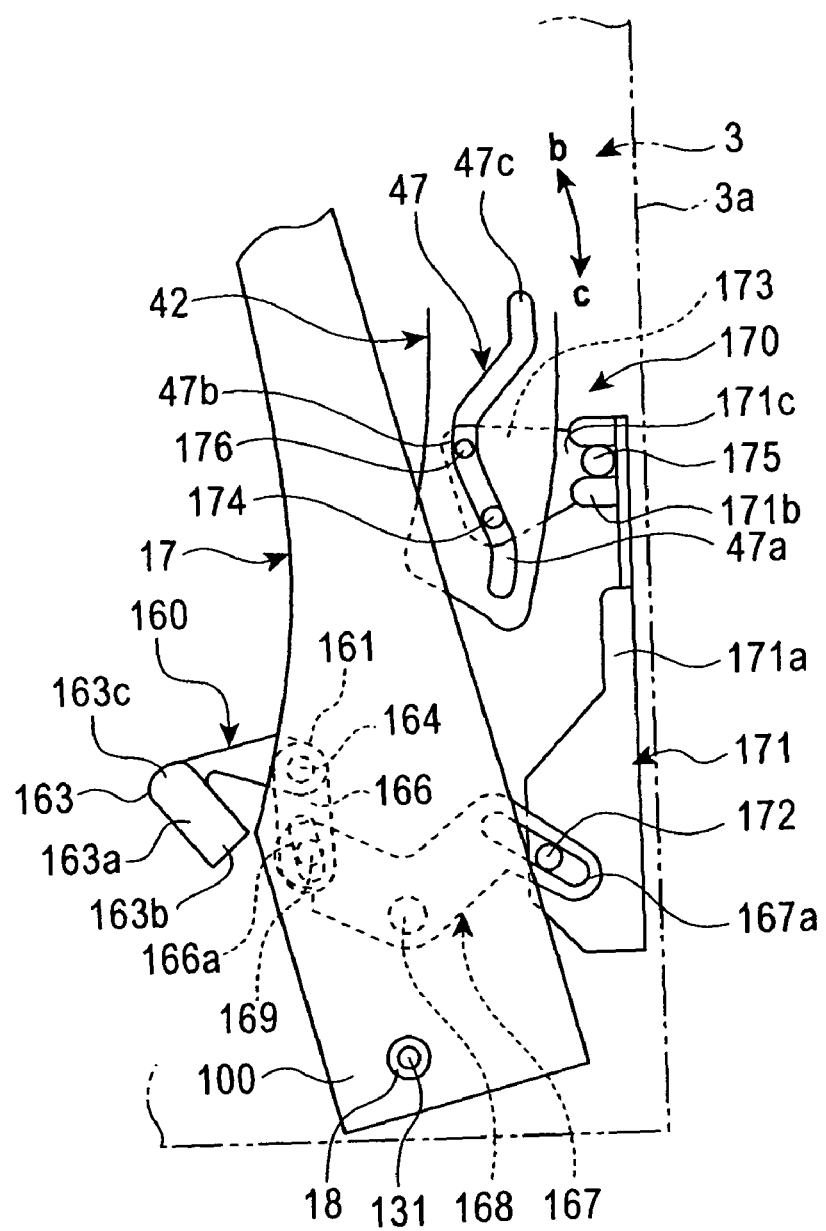
Figure 14:
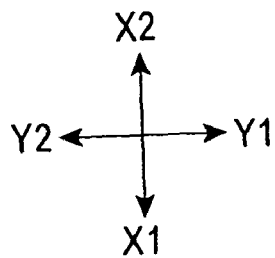

If the lock switchover member 42 is moved a predetermined distance in the (c) direction from the position shown in FIGS. 10 and 12, the locking member 61 moves in the X1 direction only half the distance of the entire movement range, the constraint shaft 78 provided on the unit supporting base 13 moves within a lifting portion 62b on the lock control hole 62, and the unit supporting base 13 is lifted up. As shown in FIGS. 14 and 15, the control pin 176 provided on the linking member 173 moves within the protrusion guide portion 47b of the protrusion control slot 47 and the linking member 173 is rotated in a counter-clockwise direction. Accordingly, the protrusion switchover member 171 moves in the X2 direction.

As shown in FIG. 14, if the protrusion switchover member 171 is moved in the X2 direction when the transporting unit 17 is rotating towards the transporting operation position, the control plate 167 rotated in a counter-clockwise direction and the protrusion supporting member 160 is rotated in a clockwise direction by the switchover pin 172. The supporting member 163 is protruded farther into the casing from the transporting unit 17 than in the case of FIG. 13. As shown in FIGS. 14 and 15, the protrusion switchover member 171 moves in the X2 direction and the control plate 167 loaded on the transporting unit 17 is rotating in a counter-clockwise direction. The center of the curvature radius of the arc-shaped course of the arc-shaped linking hold 167a which is formed on the control plate 167 matches the axial center of the reference shaft 131 which is the rotation fulcrum of the transporting unit 17. If the transporting unit 17 is restored to the standby position, as shown in FIG. 15, from the transporting operation position, shown in FIG. 14, while the protrusion switchover member 171 is in the state of moving in the X2 direction, the relative attitude of the control plate 167 and protrusion supporting member 160 within the transporting unit 17 does not change.

Therefore, the protruding amount of the supporting member 163 from the transporting unit 17 is the same in the state shown in FIG. 14 and in the state shown in FIG. 15. As shown in FIG. 15, when the protrusion switchover member 171 moves in the X2 direction and the transporting unit 17 is in a standby position, the supporting member 163 faces the disk D held by the supporting member 21 in the selected position (a) while in contact with the bottom side of the perimeter portion of the disk D.

Restriction Guide Member

Figure 16A:
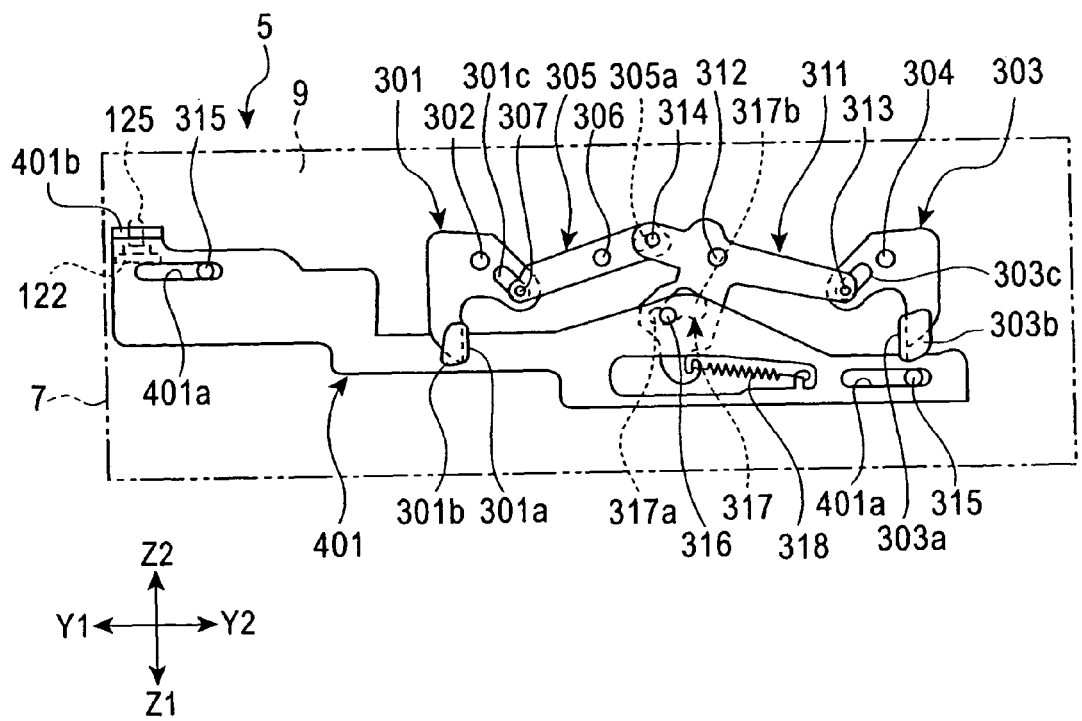
FIGS. 16A and 16B are partial side view diagrams of one embodiment of a restriction guide switchover function provided on the inner side of the left side face of the casing, by operational function, seen from the inner side of the casing.
Figure 16B:
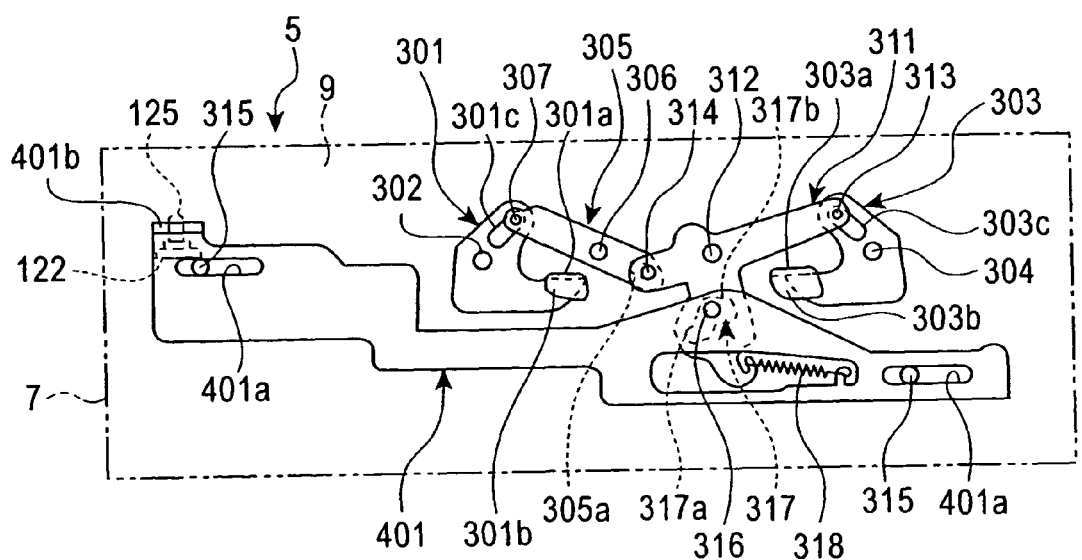

FIGS. 16A, 16B, and 17 are inside side wall view diagrams of the left side face 9 of the upper casing 5 seen from the inside of the casing 2.

A pair of restriction guide members 301 and 303 are provided on the inner side of the left side face 9. Both of the restriction guide members 301 and 303 are formed of a metallic plate. The restriction guide member 301 which is positioned on the side near the front face 7 of the casing 2 is turnably supported with the supporting shaft 302 on the inner side of the left side face 9. The restriction guide member 303 which is positioned on the far back side (Y2 side) of the casing 2 is turnably supported by the supporting shaft 304 on the inner side of the left side face 9.

The restriction guide member 301 includes a restriction face 301a on one side that is bent perpendicularly in the inner direction of the casing 2 and an inclined guide face 301b which is continuous from the restriction face 301a. When the restriction guide member 301 is in the attitude shown in FIG. 16A, the inclined guide face 301b is inclined in the Y1 direction as progressing toward the interior of the casing 2. The restriction guide member 303 on the other side includes a restriction face 303a bent perpendicularly in the inner direction of the casing 2 and an inclined guide face 303b which is continuous from the restriction face 303a. When the restriction guide member 303 is in the attitude shown in FIG. 16A, the inclined guide face 303b is inclined in the Y2 direction as progressing toward the interior of the casing 2.

A first linking member 305 is provided on the Y2 side of the restriction guide member 301. This first linking member 305 is turnably supported by the shaft 306 on the inner side of the left side face 9. A driving pin 307 is affixed to the first linking member 305, and the driving pin 307 is inserted in the slot 301c formed on the restriction guide member 301. A second linking member 311 is provided farther on the Y1 side than the restriction guide member 301. The second linking member 311 is turnably supported by the shaft 312 on the inner side of the left side face 9. A driving pin 313 is affixed to the first linking member 311. The driving pin 313 is inserted in the slot 303c formed on the restriction guide member 303. A linking slot 305a is formed on the first linking member 305. The linking pin 314 affixed to the second linking member 311 is inserted in the linking slot 305a.

The front and back restriction guide members 301 and 303 are synchronized and rotated by the first linking member 305 and the second linking member 311.

A transmission switchover member (transmission member) 401 is provided on the inner side of the left side face 9. Slots 401a, 401a extending in the Y1-Y2 direction are formed on the transmission switchover member 401. The slots 401a, 401a are slidably supported by the guide shafts 315, 315 affixed on the inner side of the left side face 9. The transmission switchover member 401 is slidably supported in the Y1-Y2 direction.

A control hole 317 is formed on the second linking member 311. The control hole 317 includes a switchover member 317a extending in the Y1 direction and a clearance portion 317b continuous farther to the Y2 side. The driving pin 316 affixed on the transmission switchover member 401 is inserted in the control hole 317. A linking spring, 318, which may be a pulling spring, is hooked between the second linking member 311 and the transmission switchover member 401.

The edge portion on the Y1 side of the transmission switchover member 401 includes a linking tab 401b bent orthogonal from the upper end in the X2 direction formed thereupon. As shown in FIGS. 10 and 19, a linking slot 401c is formed on the linking tab 401b. The switchover pin 125 affixed to the switchover lever 122 provided on the mechanism base 15 is inserted in the linking slot 401c.

The switchover level 122 is rotated with the moving force of the switchover member 91 provided on the mechanism base 15 and the transmission switchover member 401 is moved in the Y1-Y2 direction with the switchover lever 122 such that the attitudes of the restriction guide member 301 and the restriction guide member 303 are controlled. As described above, the shutter opening/closing member 126 is operated by the switchover member 91 to control the opening/closing control of the shutter 201. The attitudes of the restriction guide member 301 and the restriction guide member 303 are synchronized with the opening/closing operation of the shutter 201 and may continuously change.

As shown in FIGS. 8 and 10, the shutter opening/closing member 126 is moved in the X1 direction when the switchover member 91 is moving in the (d) direction. As shown in FIG. 18A, the shutter 201 lowers and the insertion opening 23 closes. At this time, the switchover slot 121 rotates the switchover lever 122 in a counter-clockwise direction. Therefore, the transmission switchover member 401 is moved in the Y1 direction by the switchover pin 125 affixed to the switchover lever 122.

As shown in FIG. 16A, the driving pin 316 provided on the transmission switchover member 91 pulls the switchover portion 317a of the control hole 317 formed on the second linking member 311 in the Y1 direction. As a result, the second linking member 311 is rotated in a clockwise direction and the first linking member 305 is rotated in a counter-clockwise direction. The restriction guide member 301 is rotated in the clockwise direction to face the restriction face 301a in an approximately perpendicular direction (the Z1-Z2 direction). Further, the restriction guide member 303 is rotated in the counter-clockwise direction and the restriction face 303a faces an approximately perpendicular direction. The restriction guide members 301 and 303 are in a non-acting attitude when the restriction faces 301a and 303a are faced in a perpendicular direction (in the direction perpendicular to the lower face of the disk D held on the lower face of the supporting member 21 in the selected position (a)).

When the switchover member 91 moves in the (e) direction from the position shown in FIG. 8 and the transmission shaft 138 arrives near the edge portion on the (d) side of the non-acting portion 137a of the unit control slot 137, the shutter opening/closing member 126 is moved in the X2 direction as shown in FIG. 9 and the shutter 201 rises to release the insertion opening 23 as shown in FIG. 18B. At this time, the switchover slot 121 rotates the switchover lever 122 in the clockwise direction and the transmission switchover member 401 moves the switchover pin 125 in the Y2 direction.

As shown FIG. 16B, the driving pin 316 provided on the transmission switchover member 401 is moved within the clearance portion 137b of the control hole 317 formed on the second linking member 311. The moving force of the transmission switchover member 401 toward the Y2 direction is transmitted to the second linking member 311 via the linking spring 318, the second linking member 311 is rotated in the counter-clockwise direction, and the first linking member 305 is rotated in the clockwise direction. Additionally, the first linking member 305 rotates the restriction guide member 301 in the counter-clockwise direction and the second linking member 311 rotates the restriction guide member 303 in the clockwise direction. The restriction face 301a formed on the restriction guide member 301 and the restriction face 303a formed on the restriction guide member 303 are both positioned on a horizontal surface approximately along the Y1-Y2 direction. The restriction guide members 301 and 303 are in guide attitude when the restriction faces 301a and 303a face an approximately horizontal direction (a direction parallel to the lower face of the disk D held on the lower face of the supporting member 21 in the selection position (a)).

As shown in FIGS. 17 and 20, when the restriction guide member 301 and the restriction guide member 303 are in guide attitude, the restriction face 301a and the restriction face 303a face the lower face of the supporting member 21 in the selection position (a) spaced a minute distance. The minute distance may be the same thickness measurement as the disk D or a slightly wider measurement thereof. When the disk D is supplied on the lower face of the supporting member 21 in the selection position (a), the edge portion of the disk D is guided to the lower face of the supporting member 21, the disk D is led to the lower face of the supporting member 21, and the disk D is positioned between the restriction faces 301a and 303a of the supporting member 21, by the inclined guide face 301b of the restriction guide member 301 and the inclined guide face 303b of the restriction guide member 303.

As shown in FIG. 16B, when the restriction guide member 301 and the restriction guide member 303 are in guide attitude, the driving pin 316 affixed on the transmission switchover member 401 is in position in the clearance portion 317b of the control hole 317 formed on the second linking member 311. The second linking member 311 resists against the pulling force of the linking spring 318 and can be rotated in the clockwise direction only a small amount. Therefore, even if the lower face of the supporting member 21 and the disk D supplied between the restriction faces 301a and 303a are slightly thicker than regulation thickness, the restriction guide members 301 and 303 are arranged so that the restriction faces 301a and 303a can rotate in the direction removed from the lower face of the supporting member 21.

The restriction guide members 301 and 303 are turnably supported by the left side face 9 of the casing 2 on a horizontal surface which is parallel with the left side face 9. However, as shown in FIGS. 20 and 21, an arrangement may be made where the restriction guide member 501 is turnably supported by a shaft 500 erected near the back side wall 10 of the casing 2. Such a restriction guide member 501 can be rotated between the guide attitude shown in FIG. 20 and the non-acting attitude shown in FIG. 21. The restriction guide member 501 rotates between the guide attitude and the non-acting attitude by the moving force of the transmission switchover member 401 being transmitted via an unshown linking mechanism.

When the restriction guide member 501 is in guide attitude, the upper face thereof (the restriction face) faces the lower face of the supporting member 21 in the selection position (a) spaced a minute distance, and when in non-acting attitude, the restrictive force of the restrictive guide member 501 retracts to a position so as not to be stacked with the supporting member 21 and the disk D held by the supporting member 21.

Third Motive Power Transmission Mechanism

The structure of the third motive power transmission mechanism 19 provided on the base face 6 of the lower casing 3 is described below. As shown in FIGS. 9, 10, and 11, the reference shaft 131 that serves as the pivot of the transportation unit 17 is fixed to the base face 6. On the lower portion of the reference shaft 131 is rotatably supported an integral gear 141. The integral gear 141 has the upper portion thereof formed of a vertical worm gear 141a and the lower portion formed as a lower gear 141b. As shown in FIG. 6, an intermediate gear 142 is provided on the base face 6 of the casing 2 that meshes with the lower gear 141b. A third motor M3 is provided on the base face 6 that include a worm gear 143 fixed to the rotation shaft of the third motor M3 that meshes with the intermediate gear 142.

As shown in FIG. 11, with the transporting unit 17, one end of the roller shaft 111 protrudes outwards from the fulcrum-side side face 103 of the unit frame 100. A roller gear 144, which is a spur gear, is fixed to the end of the roller shaft 111 protruding from the side face 103. A shaft 145 is formed to the side face 103, and an integral gear 146 is rotatably supported by the shaft 145. The integral gear 146 includes a small-diameter spur gear 146a and a large-diameter spur gear 146b, with the small-diameter spur gear 146a meshing with the roller gear 144.

A supporting piece 102a protruding downwards is formed integrally on the lower face 102 of the unit frame 100 by bending the supporting piece 102a downward. A shaft 148 is fixed to this supporting piece 102a. The shaft 148 extends in parallel with the roller shaft 111. An integral gear 147 is rotatably supported by the shaft 148. The integral gear 147 includes a spur gear 147a and a worm wheel 147b. The spur gear 147a meshes with the large-diameter spur gear 146b.

In the state that the bearing portion 129 provided to the transporting unit 17 is rotatably supported on the hollow shaft 18 and the reference shaft 131 is inserted in the hollow shaft 18, the worm wheel 147b and the worm gear 141a mesh. The rotational motive force of the third motor M3 is transmitted form the intermediate gear 142 to the lower gear 141b and the worm gear 141a, and further from the worm gear 141a to the worm wheel 147b. The motive force thereof is transmitted from the spur gear 147a to the large-diameter spur gear 146b, and further from the small-diameter spur gear 146a to the roller gear 144.

The rotational motive force of the third motor M3 provided on the lower casing 3 side is transmitted to the roller gar 144 via the integral gear 141 concentrically rotating with the reference shaft 131 so that the roller shaft 111 can be driven independently from the action of turning the transporting unit 17 from the standby position to the transporting operation position, with the reference shaft 131 serving as a fulcrum. The disk storing disk device 1 has separately provided the transporting unit turning means for turning the transporting unit 17 from the standby position to the transporting operation position, and the roller driving means for driving the transporting rollers 112 and 113, so that the transporting unit turning means and the roller driving means can be operated independently.

Supporting Member Selecting Mechanism

Below is a description regarding the structure of the supporting member selecting mechanism 22 provided in the upper casing 5. As shown in FIGS. 1 and 2B, three selecting shafts 151A, 151B, and 151C, mutually parallel and extending downwards, are rotatably supported by the ceiling face 11 of the upper casing 5.

A selecting groove 152 is formed on the perimeter of each of the selecting shafts 151A, 151B, and 151C. The selection groove 152 is formed as a spiral. As shown in FIG. 2B, the spiral form of the selection groove 152 includes a fine-pitched portion 152a at the upper part of the selecting shafts 151A, 151B, and 151C, and a fine-pitched portion 152b at the lower part thereof. At the upper fine-pitched portion 152a and the lower fine-pitched portion 152b, the selection groove 152 is formed at a short pitch, with the selection groove 152 at the upper fine-pitched portion 152a and the lower fine-pitched portion 152b each being formed with at least five turns (five threads). The intermediate portions of the selecting shafts 151A, 151B, and 151C include selection grooves 152 formed as coarse-pitch portions 152c, with each selection groove 152 making only one turn between the upper fine-pitched portion 152a and the lower fine-pitched portion 152b.

Six supporting members 21 are stacked vertically, each supporting member 21 being formed of a thin metal plate. As shown in FIGS. 19 through 22, each supporting member has a left side edge 21b approximately parallel to the left side face of the casing 2, and a back edge 21c approximately parallel to the back edge face of the casing 2. An inner edge 21a of the supporting members 21 has a convex curved shape facing the inner side of the casing. When the driving unit 14 is positioned facing the intervention position, the inner edge 21a of the supporting member 21 is at a position away from the perimeter of the turntable 82.

A recessed clearance portion 21d is formed on the Y1 side on the left side edge 21b of each supporting member 21. A recessed clearance portion 21e is formed on the Y2 side thereof. As shown in FIG. 16A, when the restriction guide member 301 and the restriction guide member 303 assumes a non-acting attitude, the restriction face 301a of the restriction guide member 301 is perpendicular and the inclined guide face 301b is positioned within the clearance portion 21d. Additionally, the restriction face 303a of the restriction guide member 303 is perpendicular and the inclined guide face 303b is positioned within the clearance portion 21e. As shown in FIGS. 20 and 21, when the restriction guide members 301 and 303 are in a non-acting attitude, the restriction faces 301a and 303a and the inclined guide faces 301b and 303b do not prevent vertical selection movement force of the supporting member 21.

As shown in FIGS. 19 through 22, each supporting member 21 includes a bearing 25A fixed at a position near the X1 side end and the Y1 side end. Each supporting member 21 includes a bearing 25B fixed at a position near the X2 side end and the Y2 side end thereof. Further, each supporting member includes a bearing 25C fixed to the supporting member 21 at a position near the inner side of the corner between the left side edge 21b and the back edge 21c. The bearing 25A is passed over the perimeter of the selection shaft 151A, the bearing 25B is passed over the perimeter of the selection shaft 151B, and the bearing 25C is passed over the perimeter of the selection shaft 151C. Engaging portions are formed integrally on the inner side of the bearings 25A, 25B, and 25C, in a protruding manner. The engaging portions are slidably engaged in the selection grooves 152 formed on the perimeter of each of the selecting shafts 151A, 151B, and 151C.

The engaging portions of the six supporting members 21 are disposed to be engaged in each of the five adjacent turns of the selection groove 152. When the selecting shafts 151A, 151B, and 151C rotate counter-clockwise when seen from above, the supporting members 21 are fed downward one at a time along the selecting shafts 151A, 151B, and 151C. When the selecting shafts 151A, 151B, and 151C rotate clockwise, the supporting members 21 are fed upward one at a time along the selecting shafts 151A, 151B, and 151C. The one of the selecting members 21 engaged with the coarse pitch portion 152c releases the selection position (a) shown in FIG. 2B. A vertical space is opened between the supporting member 21 at the selection position (a) and the supporting member 21 situated at the lower fine-pitched portion 152b such that the driving unit 14 can be inserted therebetween.

As shown in FIG. 2B, the supporting member 21 at the selection position (a) is positioned on the upper side of a loose pitch portion 152c. The supporting member 21 adjacent to the lower side of the supporting member 21 at the selection position (a) is retained at the selection groove 152 of the upper-most pitch of the downward tight pitch portion 152b. A relatively wide space is spread vertically between the supporting member 21 on the lower side and the supporting member at the selection position (a).

An unshown thin pinion is provided on the upper edge of each selection shaft 151A, 151B, and 151C. The pinion is arranged to be turnable while adhered to the lower face of the ceiling face 11. An unshown thin ring gear of a large diameter is provided on the lower face of the ceiling face 11 to be turnable. The pinions provided on selection shafts 151A, 151B, and 151C mesh with the teeth of the ring gear. Accordingly, all of the pinions are synchronized and rotatably driven and the three selection shaft 151A, 151B, and 151C are synchronized and rotatably driven, by the rotation of the ring gear.

As shown in FIG. 2B, a rotational shaft 99a is rotatably supported on the lower face of the ceiling face 11 of the upper casing 5. The transmission gear 99 shown in FIGS. 8 and 9 is fixed on the lower end of the rotational shaft 99. The transmission gear 99 meshes with the second switchover gear 98 of the second motive force transmission mechanism 16. A thin gear 99b is fixed at the upper end of the rotational shaft 99a that is engaged with the teeth of the ring gear. As shown in FIG. 8, when the second switchover gear 98 of the second motive force transmission mechanism 16 is meshed with the output gear 94 and the transmission gear 99, and the first switchover gear 95 is disengaged from the output gear 94, starting the second motor M2 transmits a motive force to the transmission gear 99. The transmission gear 99 drives the chain gear 99b and the ring gear.

In one embodiment, as described above, a supporting member selecting mechanism for moving a selected supporting member 21 to the selection position (a) and spreading the gap with the supporting member 21 below the selected supporting member 21 includes three selecting shafts 151A, 151B, and 151C, each having selecting grooves 152. The supporting member selecting mechanism additionally includes bearings 25A, 25B, and 25C, each of the three engaging portions engaged with the selecting grooves 152; pinions which integrally rotate with the selecting shafts 151A, 151B, and 151C; a ring gear which meshes with all of the pinions; and a transmission gear 99 which rotationally drives the ring gear.

The supporting member selecting mechanism is not restricted to the arrangement described above, and may be substituted with other known mechanisms (e.g., a supporting member selecting mechanism using a cam gear described in Japanese Unexamined Patent Application Publication No. 2004-63017.

Disk Holding Mechanism

As shown in FIGS. 19 through 22, each of the supporting members 21 includes three holding members 26, 27, and 28. The holding members 26, 27, and 28 are provided on the lower face (Z1 side face) of each supporting member 21 shown in FIGS. 19 through 22. The holding members 26, 27, and 28 are illustrated by transparent view through the supporting member 21 with solid lines in FIG. 19 through 22. The holding member 26 is supported to turn on the perimeter of the bearing 25A. The holding member 27 is supported to turn on the perimeter of the bearing 25B and the holding member 28 is supported to turn on the perimeter of the bearing 25C.

The holding member 26 and the supporting member 21 have spanned therebetween a pulling coil spring 29a that pulls the holding member 26 in a turning fashion in the counter-clockwise direction (γ2 direction). A stopper (not shown) is provided to the supporting member 21 restricts the holding member 26 from turning in the counter-clockwise direction (γ2 direction) beyond the attitude shown in FIG. 21. A pulling spring 29b pulls the holding member 27 in the clockwise direction (γ4 direction) and a stopper (not shown) on the supporting member 21 restricts the holding member 27 so that it does not turn in the clockwise direction (γ4 direction) beyond the attitude shown in FIG. 19. In the same way, a pulling spring 29c pulls the holding member 28 in the clockwise direction and a stopper (not shown) on the supporting member 21 restricts the holding member 28 so that it does not turn in the clockwise direction (γ4 direction) beyond the attitude shown in FIG. 19.

The holding members 26, 27, and 28 may comprise a synthetic resin. Each holding member 26, 27, and 28 includes a holding claw 26b, 27b, and 28b. The holding claws 26b, 27b, and 28b face the lower face of the supporting member 21, leaving a space between. The disk D supplied on the lower side of the supporting member 21 is held between the lower face of the supporting member 21 and each holding claw 26b, 27b, and 28b.

As shown in FIGS. 19 through 22, a loading detecting unit 180 for detecting that a disk D has been loaded to a supporting member 21 at the selecting position (a) is located in the corner between the left side face 9 of the casing 2 and the back side face 10 thereof. The loading detecting unit 180 has a photodetector 181. The photodetector 181 is configured such that a light-emitting element and a photoreceptor are facing each other. Only one such photodetector 181 is provided in the casing 2 at the same height as a supporting member 21 which has moved to the selecting position (a). Each of the holding members 28 provided to the supporting members 21 provided to the supporting members 21 include an integrated detecting portion 28h protruding thereupon.

When a supporting member 21 moved to the selecting position (a), the detecting portion 28h faces the photodetector 181. As shown in FIGS. 19 and 20, when a disk D is not held by the supporting member 21 which has moved to the selecting position (a), the detecting portion 28h interferes between the light-emitting device and the photoreceptor of the photodetector 181 since the holding member 28 is turned widely in the γ4 direction by the pulling coil spring 29c so that the detection output is OFF. As shown in FIG. 21, when a disk D is held by the supporting member 21 which has moved to the selecting position (a), the arm 28a of the holding member 28a is pressed at the perimeter of the disk D and the perimeter of the disk D comes into contact with the positioning face 28c such that the holding member 28 is slightly turned in the γ3 direction. The detecting portion 28h comes out from the photodetector 181 so that the detection output of the photodetector 181 is ON.

At the mechanism control unit, monitoring the detection output of the photodetector 181 switching from OFF to ON at the time of the disk D being transported in enables recognition that the disk D has been positioned and held by the supporting member 21.

Note that the holding member 28 which has turned to the position shown in FIG. 21 is constantly pulled in the clockwise direction by the pulling coil spring 29c, and that the disk D is continuously pressed in the Y1 direction due to this force. However, a restricting mechanism (not shown) is provided within the casing, which enters the center hole Da of the disk D held by the supporting member 21 when the disk D is not being held on the turntable. When the driving unit 17 is in a retracting position, the disk D does not come loose from the supporting member 21 due to the force acting on the holding member 28.

As shown in FIGS. 19 through 22, a first holding switchover member 403 is provided on the inner side of the left side face 9 of the casing 2 that is stacked on the inner side of the transmission switchover member 401. The first holding switchover member 403 is slidably supported in the Y1-Y2 direction by the transmission switchover member 401. A linking spring is hooked between the transmission switchover member 401 and the first holding switchover member 403. The first holding switchover member 403 is pulled in the Y1 direction and the transmission switchover member 401 is pulled in the Y2 direction with the linking spring. The transmission switchover member 401 and the first holding switchover member 403 are integrated with one another.

A second holding switchover member 404 which moves in the X1-X2 direction is provided on the inner side of the rear side face 10 of the casing 2. The first holding switchover member 403 and the second holding switchover member 404 are operated together by the motive force of an unshown holding disengaging mechanism.

In FIGS. 19 and 20, the switchover lever 122 is rotated in the clockwise direction and moves the transmission switchover member 401 and the first holding switchover member 403 in the Y2 direction the first holding switchover member 403 rotates the holding member 26 in the γ1 direction. In FIGS. 19 and 20, a second holding switchover member 404 is moved in the X2 direction, whereby the second switchover member 404 is removed from the holding member 27 and the holding member 28. The holding member 27 and the holding member 28 are rotated together in the γ4 direction by the pulling force of the pulling springs 29b and 29c.

As shown in FIG. 21, when the switchover lever 122 is rotated in the counter-clockwise direction, the switchover pin 125 moves the transmission switchover member 401 and the first holding switchover member 403 together in the Y1 direction. The first holding switchover member 403 is removed from the holding member 26, and the pulling spring 29a rotates the holding member 26 in the γ2 direction.

Figure 22:
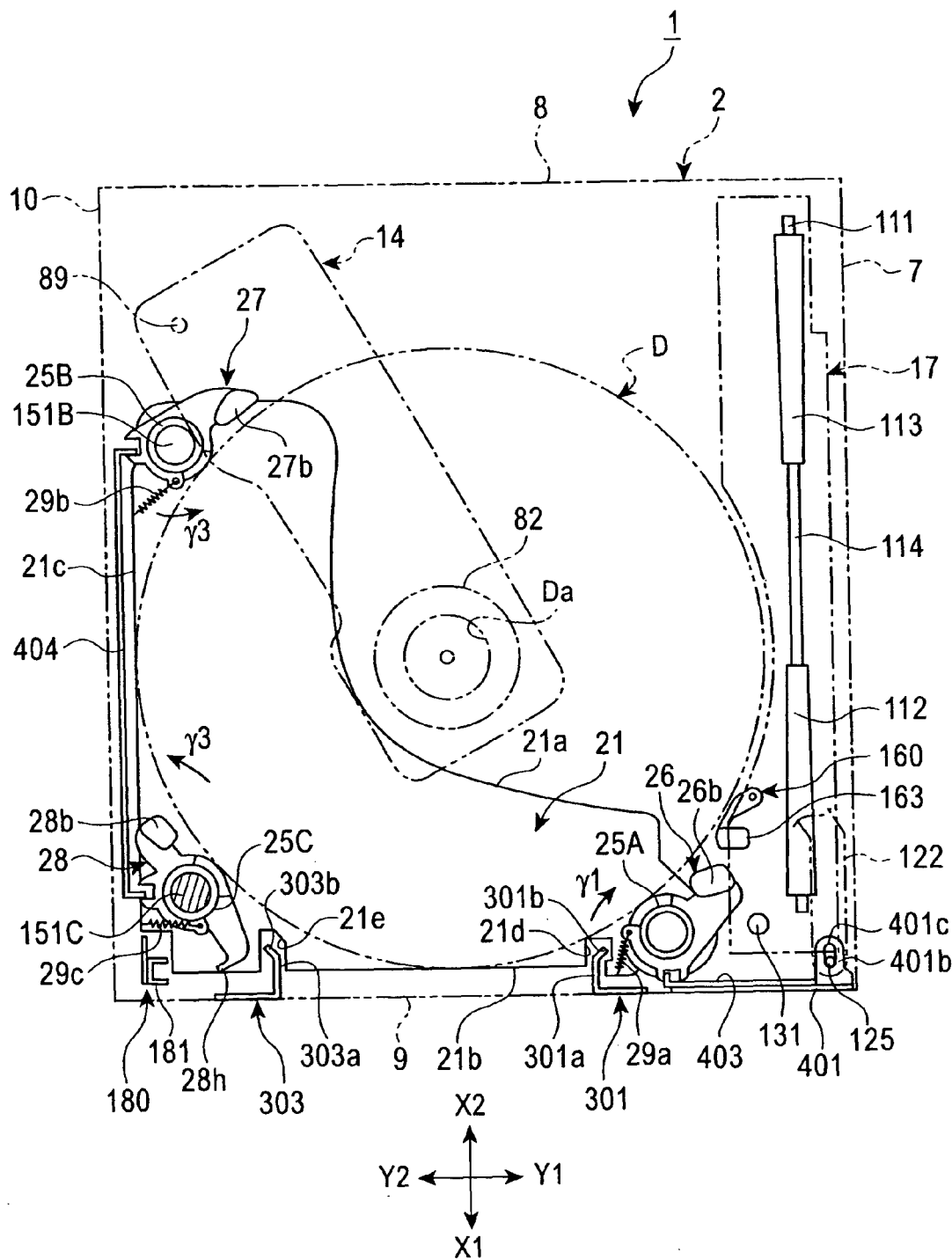

As shown in FIG. 22, when the switchover lever 122 is rotated in the counter-clockwise direction and the first holding switchover member 403 is driven in the Y2 direction by the unshown holding disengaging mechanism, while the switchover pin 125 holds the transmission switchover member 401 is in the Y1 direction, the linking spring is stretched and only the first holding switchover member 403 is moved in the Y2 direction. At substantially the same time, the second holding switchover member 404 is driven in the X1 direction by the holding disengaging mechanism. The first holding switchover member 403 rotates the holding member 26 is rotated in the γ1 direction, the second holding switchover member 404 rotates the holding members 27 and 28 in the γ3 direction, and all of the holding claws 26b, 27b, and 28b are moved to the outer side of the perimeter of the disk D.

Below is a description of the overall operation of the disk storing disk device 1.

Supporting Member Selection Operation

When moving one of the six supporting members 21 in the disk-storing region 20 to the selection position (a), the rack member 32 is set at the starting point and the first motor M1 of the first motive force transmission mechanism moves the rack member 32 in the farthest Y2 direction, as shown in FIG. 3. The slider 31 and switchover lever 38 are moved in the Y2 direction, and as shown in FIG. 6, the driving slider 85 provided on the lower face of the unit supporting base 13 is moved in the Y2 direction by the switchover driving pin 41 provided on the switchover lever 38. Further, the driving unit 14 is set to a retracting position which does not abut against the disk D stored in the disk-storing region 20.

When the rack member 32 is positioned farthest toward the Y2 side, the linking turning lever 44 rotates in the clockwise direction and is stopped at a position with the lock switchover member 42 moved in the (b) direction. The switchover slot 42c formed on the end on the Y2 side of the lock switchover member 42 rotates the transmission member 52 in the clockwise direction and the locking member 54 provided on the inner side of the back bent piece 3b of the lower casing 3 is moved in the X2 direction. As shown in FIG. 10, the driving pin 46 fixed to the lock switchover member 42 moves the locking member 61 provided on the inner side of the front bent piece 3a of the lower casing 3 in the X2 direction.

At this time, the restricting shaft 77 provided behind the unit supporting base 13 is held within the restricting portion 56a of the lock control hole 56 formed in the locking member 54 shown in FIG. 1 and the restricting shafts 78 provided to the front of the unit supporting base 13 are also held by the restricting portions 62a of the lock control holes 62 formed in the locking member 61 shown in FIGS. 2B and 10. The unit supporting base 13 is lowered to a position in proximity of the base face 6 by smashing the dampers 71, 72, and 73. At the lowered position, the unit supporting base 13 and the driving unit 14 are restricted in that elastic movement (moment in a state of being elastically supported by the dampers 71, 72, and 73) is disabled.

As shown in FIGS. 10 and 12, when the locking switchover member 42 is moved in the (b) direction, the control pin 176 of the linking member 173 provided on the base face 6 of the lower casing 3, is led into the first retracted guide portion 47*a* of the protrusion control slot 47 formed on the edge portion on the (c) side of the locking switchover member 42. The linking member 173 is rotated in the clockwise direction, and the linking pin 175 affixed on the linking member 173 the protrusion switchover member 171 in the X1 direction.

At this time, the second motive force transmission mechanism 16 shown in FIG. 8 removes the first switchover gear 95 from the output gear 94 and moves the switchover member 91 to the initial position in the (e) direction without transmitting rotational force to the pinion gear 97. When the switchover member 91 is stopped at the initial position, the transmission shaft 138 is positioned at the non-acting portion 137*a* of the unit control slot 137 formed on the switchover member 91. The driving lever 135 is held at a state of being rotated in the clockwise direction, and the transporting unit 17 is set at a standby position to not abut against the disk D within the disk-storing region 20.

As shown in FIG. 12, since the protrusion switchover member 171 is moved in the X1 direction, the switchover pin 172 affixed on the protrusion switchover member 171 rotates the control plate 167 provided on the transporting unit 17 in a clockwise direction. The driving plate 166 and the protrusion supporting member 160 which is integrated with the driving plate 166 are rotated in the counter-clockwise direction by the linking pin 169 provided on the control plate 167. The supporting member 163 of the protrusion supporting member 160 retracts into the transporting unit 17, and as shown in FIG. 10, is held in the recessed portion of the holder 165 affixed on the transporting unit 17. As shown with the solid lines in FIG. 21, the supporting member 163 is positioned farther toward the outside than the perimeter of the disk stored in the disk-storing region 20.

As shown in FIG. 8, when the switchover member 91 is stopped at the initial position, the switchover member 91 moves the shutter opening/closing member 126 provided on the inner side of the front face 7 in the X1 direction. As shown in FIG. 18A, the shutter 201 is lowered and the insertion opening 23 which opens to the front face 7 is closed.

As shown in FIG. 8, the switchover lever 122 is rotated in the counter-clockwise direction by the switchover slot 121 of the switchover member 91, and the switchover pin 125 affixed on the switchover lever 122 is moved to the Y1 side. As shown in FIG. 16A, the transmission switchover member 401 is moved in the Y1 direction by the switchover pin 125, the second linking member 311 is rotated in the clockwise direction, and the first linking member 305 is rotated in the counter-clockwise direction, by the driving pin 316 provided on the transmission switchover member 401.

The restriction guide member 301 and the restriction guide member 303 are rotated to the non-acting attitude. As shown in FIG. 21, the restriction face 301*a* and the inclined guide face 301*b*, in a perpendicular attitude of the restriction guide member 301, are positioned within the recessed clearance portion 21*d* of the supporting member 21. The restriction face 303*a* and the inclined guide face 303*b* in a perpendicular attitude of the restriction guide member 303 are positioned within the recessed clearance portion 21*e*. The restriction face 301*a* and the inclined guide face 301*b*, and the restriction face 303*a* and the inclined guide face 303*b*, are retracted to the outside of the perimeter of the disk D. Accordingly, the selection movement, wherein the supporting member 21 is moved vertically, is not prevented with the restriction guide members 301 and 303.

When the transmission switchover member 401 is moved in the Y1 direction, the first holding switchover member 403 linked with a linking spring to the transmission switchover member 401 is also moved in the Y1 direction, as shown in FIG. 21. The first holding switchover member 403 is removed from the holding member 26, and the holding member 26 is rotated in the γ2 direction by the pulling spring 29*a*. As shown in FIG. 21, the second holding switchover member 404 provided on the inner side of the rear side face 10 is moved in the X2 direction to be removed from the holding members 27 and 28. The pulling springs 29*b* and 29*c* rotate holding members 27 and 28 in the γ4 direction. When the disk D is supplied to the supporting member 21, the disk D is held between the holding claws 26*b*, 27*b*, and 28*b* and the lower face of the supporting member 21. At this time, the restriction mechanism provided within the casing 2 is positioned in the center hole Da of the disk D held by the supported member 21, thereby presenting the disk D from falling from the supporting member 21.

When an operation is performed to select one of the supporting members 21 by operation an operation unit provided on the front side of the casing 2 or a remote control device, the second motor M2 shown in FIG. 8 is started. The second switchover gear 98 shown in FIG. 8 is meshed with both the output gear 94 and transmission gear 99 so that the rotational force of the second motor M2 is transmitted from the output gear 94 to the transmission gear 99 via the second switchover gear 98. The transmission gear 99 drives a ring gear provided on the lower face of the ceiling face 11 of the casing 2 and the three selection shafts 151A, 151B, and 151C provided on the supporting member selection mechanism 22 are synchronized and rotated. With the rotation of the three selection shafts 151A, 151B, and 151C, the supporting members 21 are sequentially fed downward, or are sequentially fed upward. A rotation detecting unit for detecting the rotational phase of the ring gear is provided within the casing 2. With the rotation detecting unit, the mechanism control unit can confirm which supporting member 21 has arrived at the selection position (a). When confirmation is made that the supporting member 21 specified by an operation has moved to the selection position (a), the second motor M2 is stopped.

Setting for Disk Insertion Standby Mode

At the time of loading a disk D to the disk storing disk device 1, an operating unit provided on the front face 7 of the casing 2, or a remote controller, is operated, to specify a supporting member 21 not holding a disk D. When the supporting member 21 not holding the disk D is moved to the selection position (a) and is stopped by the supporting member selection operation, the first motor M1 shown in FIG. 3 is started with the mechanism control.

The motive force of the first motor M1 moves the rack member 32 in the Y1 direction from the position shown in FIG. 3. The first motor M1 stops at the point that the rack member 32 has moved to the position shown in FIG. 4. The switchover driving pin 41 provided to the switchover lever 38 moves the driving slider 85 is moved from the position shown in FIG. 6 to the position shown in FIG. 7. The driving shaft 88 is pulled in the Y1 direction by the driving slider 85. At this time, the motive force of the driving slider 85 acts upon the driving shaft 88 via the linking mechanism, and the driving shaft 88 moves along the arc guide 13*e* formed in the unit supporting base 13. The driving unit 14 turns in the clockwise direction on the supporting shaft 84 as a pivot.

While the rack member 32 moves from the starting end shown in FIG. 3 to the position shown in FIG. 4, the linking turning lever 44 is stopped at the position to which it has been turned in the clockwise direction. The lock switchover member 42 is stopped at the state in which it has moved in the (b)

direction. The transmission member 52 positioned at the edge portion on the Y2 side of the first motive force transmission mechanism 12 remains having rotated in the clockwise direction, and the locking member 54 is stopped at a position on the X2 side. As shown in FIGS. 2B and 10, the locking member 61 provided on the inner side of the front bent piece 3a of the lower casing 3 is stopped at a position near the X2 side. The unit supporting base 13 remains in a state of having been lowered. Due to the fact the lock switchover member 42 is moved towards the (b) direction and is stopped, the linking member 173 remains stationary having rotated in the counter-clockwise direction. Additionally, protrusion switchover member 171 is stopped at a position having moved toward the X1 direction.

Since the driving unit 14 is rotated toward the interventional position on the unit supporting base 13 while the unit supporting base 13 is in a lowered state, the turntable 82 provided on the driving unit 14 does not abut against the disk D held by the supporting member 21 at the selection position (a) and the lower side of the disk D can be moved.

When the unshown detecting means detects that the driving unit 14 has finished moving toward the intervention position shown in FIG. 19, the second motor M2 shown in FIG. 8 starts. The first switchover gear 95 shown in FIG. 8 meshes with both the output gear 94 and the gear 96 by the unshown switchover mechanism. The second switchover gear 98 is removed from the transmission gear 99, and the motive force of the second motor M2 becomes capable of transmitting to the pinion gear 97.

When the second motor M2 drives the pinion gear 97 in the clockwise direction, a motive force is applied to the rack gear 91b, thereby driving the second switchover member 91 in the (e) direction. The second motor M2 is stopped when the switchover member 91 is moved from the position shown in FIG. 8 to the (e) direction. The transmission shaft 138 arrives at the edge portion on the (d) side of the non-acting portion 137a of the unit control slot 137 and the switchover member 91 is stopped.

When the switchover member 91 stops at the position described above, the driving pin 127 provided on the switchover member 91 moves the shutter opening/closing member 126 in the X2 direction. As shown in FIG. 18B, the sliding pins 203, 203, provided on the shutter 201, are led to the release portions 202b, 202b of the opening/closing cam 202, 202 formed on the shutter opening/closing member 126. The shutter 201 is raised in the Z2 direction and the insertion opening 23 is released.

When the switchover member 91 is stopped at the position described above, the control pin 124 provided on the switchover lever 122 shown in FIG. 8 moves from the first arc-shaped portion 121a of the switchover slot 121 formed on the switchover member 91 to the second arc-shaped portion 121b via the switchover member 121c. The switchover lever 122 is rotated in the clockwise direction, and the switchover pin 125 provided on the edge portion on the X1 side of the switchover lever 122 is moved in the Y2 direction as shown in FIGS. 16B and 19.

As shown in FIG. 16B, when the switchover pin 125 moves in the Y2 direction, the switchover pin 125 moves the transmission switchover member 401 in the Y2 direction. The motive force of the transmission switchover member 401 acts upon the second linking member 311 via the linking spring 318, and the second linking member 311 is rotated in the counter-clockwise direction. Additionally, the first linking member 305 is rotated in the clockwise direction. As shown in FIGS. 16B and 17, the restriction guide member 301 turns in the counter-clockwise direction and the restriction guide member 303 turns in the clockwise direction so that both assume the guide attitude. At this time, the restriction face 301a of the restriction guide member 301 faces the lower side of the supporting member 21 at the selection position (a) while leaving a minute spacing therebetween. The restriction face 303a of the restriction guide member 303 also faces the lower side of the supporting member 21 while leaving a minute spacing therebetween.

As shown in FIG. 19, when the switchover pin 125 moves the transmission switchover member 401 in the Y2 direction, the transmission switchover member 401 and the first holding switchover member 403, linked via the linking spring, move in the Y2 direction. Additionally, the first holding member 403 widely rotates the holding member 26 in the γ1 direction. As shown in FIG. 19, the second holding switchover member 404 provided within the rear side face 10 of the casing 2 remains in a state of being moved in the X2 direction, and the holding members 27 and 28 remain in a state of being rotated in the γ4 direction by the elastic force of the pulling springs 29b and 29c.

In the disk insertion standby mode, the driving unit 14 rotates to the intervention position, the shutter 201 is raised, and the insertion opening 23 is released. The restriction guide members 301 and 303 are arranged in guide attitude, and as shown in FIG. 17, the restriction faces 301a and 303a face the lower face of the supporting member 21 at the selection position (a). As shown in FIG. 19, with the supporting member 21 at the selection position (a), the holding member 26 at the position closest to the insertion opening 23 is rotated in the clockwise direction. The transporting unit 17 is in a standby position, and as shown in FIGS. 12, 17, and 19, the protrusion supporting member 160 provided on the transporting unit 17 are rotated in the counter-clockwise direction. The supporting member 163 provided on the protrusion supporting member 160 is positioned farther on the outside than the perimeter of the disk D held by the supporting member 21.

Disk Carry-in Operation

When a disk D is inserted from the insertion opening 23 and an unshown insertion detection unit detects the insertion of the disk, the third motor M3 shown in FIG. 7 starts, the roller shaft 111 of the transportation unit 17 in the standby position starts, and the first transporting roller 112 and the second transporting roller 113 rotate in the carry-in direction. When the disk D is nipped between the first transporting roller 112, the second transporting roller 113, and the nipping portion 106, the rotational force of the transporting rollers 112 and 113 carries the disk D into the casing 2.

As shown in FIG. 19, the disk D is carried in the casing 2 with the center D0 thereof being moved over the insertion center line Oa and the transporting unit 17 being in a standby position. When the disk D which is transported with the transporting unit 17 in the standby position moves to the position shown in FIG. 19, that is to say, when the center D0 of the disk D is moved slightly further within the case 2 than the transporting force transporting position by the transporting rollers 112 and 113, the second motor M2 shown in FIG. 8 restarts, and the switchover member 91 is moved in the (e) direction. As soon as the switchover member 91 begins to move in the (e) direction, the transmitting shaft 138 is led into the driving inclined portion 137b of the unit control slot 137, and the driving lever 135 is rotated in the counter-clockwise direction. The driving lever 135 rotates the transporting unit 17 in the counter-clockwise direction with the reference shaft 131 as the center thereof and the transporting unit 17 arrives at the transporting operation position shown in FIG. 20.

As shown in FIG. 9, the shutter opening/closing member 126 is moved in the X2 direction, and as shown in FIG. 18B, the shutter 201 maintains a state of being moved in the Z2 direction and the insertion opening 23 remains released. Since the switchover lever 122 is rotating in the clockwise direction, the transmitting switchover member 401 remains in the state of being moved in the Y2 direction, and as shown in FIG. 17, the restriction guide members 301 and 303 are set in guide attitude. Since the transmitting switchover member 401 and the first holding switchover member 403 are moved in the Y2 direction together, the holding member 26 in a position close to the insertion opening 23 remains in a state of being rotated in the clockwise direction.

As shown in FIG. 13, since the lock switchover member 42 is not moving at this time, the protrusion switchover member 171 is stopped at a position near the X1 side. In this state, when the transporting unit 17 is rotated in the counter-clockwise direction, the switchover pin 172 of the protrusion switchover member 171 restricts the control plate 167. The control plate 167 is rotated in the counter-clockwise direction in accordance with the rotation operation of the transporting unit 17, the driving plate 166 and the protrusion supporting member 160 are rotated in the clockwise direction, and the supporting member 163 protrudes slightly from the transporting unit 17 into the interior of the casing 2. The lower face of the disk D transported with the transporting rollers 112 and 113 of the transporting unit 17, which is rotated to the transporting operation position, is transported facing the lower face of the supporting member 21 while being supported by the upper face 163a of the supporting member 163 protruding towards the front of the transporting unit 17.

During the time the transporting unit 17 is rotating from the standby position shown in FIG. 19 to the transporting operation position shown in FIG. 20, and after the rotation thereof is finished, the transporting rollers 112 and 113 continue to rotate in the carry-in direction. In the state shown in FIG. 20, the disk D is carried into the casing 2, with the center D0 thereof following along the carry-in center line Ob, with the transporting unit 17 which is at the transporting operation position.

During the time the disk D is being carried in toward the supporting member 21, the holding member 26 maintains a state of being rotated in the γ1 direction. As shown in FIG. 20, the disk D can be prevented from abutting against the holding member 26 when the disk D passes through a position in close proximity to the selection shaft 151A and the bearing 25A.

As shown in FIG. 20, when the disk D is carried in along the carry-in center line Ob, the restriction face 301a and inclined guide face 301b of the restriction guide member 301 and the restriction face 303a and inclined guide face 303b of the restriction guide member 303 face the lower face of the supporting member 21 farther on the inner side than the left edge 21b of the supporting member 21 at the selection position (a). The peripheral portion of the disk D is guided with the slope guide face 301b and the slope guide face 303b, and the peripheral portion of the disk D is led between the lower face of the supporting member 21 and the restriction face 301a, and between the lower face of the supporting member 21 and the restriction face 303a.

As shown in FIG. 20, the disk D being carried in with the rotational force of the transporting rollers 112 and 113 of the transporting unit 17 at the transporting operation position is first led between the lower face of the supporting member 21 and the restriction face 301a the disk D is supported from below so that the disk D is almost adhered to the lower face of the supporting member 21. The disk D enters between the lower face of the supporting member 21 and the restriction face 303a. The disk D is securely led between the lower face of the supporting member 21 and the holding claw 28b of the holding member 28, and between the lower face of the supporting member 21 and the holding claw 27b of the holding member 27. At this time, the disk D is supported so as to follow the lower face of the supporting member 21 by the restriction faces 301a and 303a. The perimeter of the disk D is guided between the supporting member 21 and the holding claw 28b, and between the supporting member 21 and the holding claw 27b, in a sure manner. Accordingly, the chance of the peripheral portion of the disk D being carried incorrectly, such as below the holding claw 28b or below the holding claw 27b, is reduced.

In other words, when the restriction guide member 301 and the restriction guide member 303 are in guide attitude, the restriction faces 301a and 303a are positioned toward the insertion opening 23 side more than are the holding claws 27b and 29b. After the disk D is nipped by at least one of the restriction faces 301a and 303a and the supporting member 21, it is desirable for the disk D to be in a positional relationship of being in between the supporting member 21 and the holding claws 27b and 28b.

After the disk D is abutted against the holding members 27 and 28 and the position thereof is determined, the holding claw 28b is pressed by the disk D, the holding member 28 is rotated slightly in the γ3 direction, the detecting unit 28h is removed from an optical detecting element 181 of a loading detecting unit 180, and the detecting output is turned ON. At this time, at the mechanism control unit confirms the disk D loaded onto the supporting member 21 at the selection position (a) and a third motor M3 is stopped, stopping the transporting rollers 112 and 113. The disk D carried into the supporting member 21 maintains the state of being nipped by the stopped transporting rollers 112 and 113 and a nipping portion 106.

Disk Clamping Operation

When a disk D is inserted from the insertion opening 23 and the insertion of the disk is detected by an unshown insertion detection unit, the third motor M3 shown in FIG. 7 starts, the roller shaft 111 of the transportation unit 17 in the standby position starts, the first transporting roller 112 and the second transporting roller 113 rotate in the carry-in direction, and the disk D is nipped between the first transporting roller 112 and the second transporting roller 113 to be carried into the casing 2.

At this time, the restricting shaft 77 provided behind the unit supporting base 13 is guided to the lifting portion 56b of the lock control hole 56 formed in the locking member 54. Additionally, the restricting shafts 78 provided to the front of the unit supporting base 13 are guided to the lifting portions 62b of the lock control holes 62 formed in the locking member 61. The unit supporting base 13 is lifted away from the base face 6, the driving unit 14 supported by the unit supporting base 13 is lifted, and the center protrusion portion 82b of the turntable 82 provided to the driving unit 14 enters the center hole Da of the disk D from below.

When the lock switchover member 42 is moved in the (c) direction, the control pin 176 of the linking member 173 provided on the base face 6 of the lower casing 3 is led to the protrusion guide portion 47b of the protrusion control slot 47 formed on the lock switchover member 42, as shown in FIG. 14. The linking member 173 is rotated in the counter-clockwise direction, and the linking pin 175 moves the protrusion switchover member 171 in the X2 direction. When the protrusion switchover member 171 moves in the X2 direction, the switchover pin 172 provided on the protrusion switchover member 171 rotates the control plate 167 provided on the transporting unit 17 in the counter-clockwise direction by, the driving plate 166 and the protrusion supporting member 160 are rotated in the clockwise direction, and supporting member 163 is protruded toward the front of the transporting unit 17. At this time, the disk D held on the lower face of the supporting member 21 at the selection position (a) is nipped by the transporting rollers 112 and 113 of the transporting unit 17 and the nipping portion 106. The supporting member 163 further supports the disk D from below.

Continuing from the operation of the center protrusion portion 82b of the turntable 82 entering into the center hole Da of the disk D, the motive force of the first motor M1 of the first motive force transmission mechanism 12 moves the rack member 32 in the Y1 direction. When the movement position is detected with unshown detecting means, the first motor M1 stops. At this time, the linking turning lever 44 does not turn, the lock switchover member 42 stops at a position shown in FIG. 14, and the slider 31 and the switchover lever 38 move in the Y1 direction. The driving slider 85 provided on the lower face of the unit supporting base 13 moves in the Y1 direction by the switchover driving pin 41 provided to the switchover lever 38.

Due to the moving force of the driving slider 85, the clamp mechanism, provided to the turntable 82 operations, clamp claws protrude from the perimeter of the center protrusion portion 82b of the turntable 82, the edge of the center hole Da of the disk D is held between the flange portion 82c and the clamp claws, and the center hole Da of the disk D is clamped to the turntable 82.

When the clamping of the disk is completed, the second motor M2 of the second motive force transmission mechanism 16 starts; the switchover member 91 is moved in the (d) direction and returned to the initial position shown in FIG. 8; and the second motor M2 stops at this point. When the switchover member 91 is moved in the (d) direction, the transmission shaft 138 is moved from the driving inclined portion 137b of the unit control slot 137 to the non-acting portion 137a. The driving lever 135 is turned in the clockwise direction, and the transporting unit 17 turns from the transporting operation position in the clockwise direction and is moved to the standby position shown in FIG. 21.

During this time, the third motor M3 rotates the transporting rollers 112 and 113 in the direction of carrying the disk D in. While the transporting rollers 112 and 113 roll over the surface of the disk D, the transporting unit 17 turns from the transporting operation position to the standby position. At this time, arranging for the circumferential velocity of the rotation of the transporting rollers 112 and 113 to be slightly faster than the turning speed of the transporting unit 17 allows the transporting unit 17 to be returned to the standby position shown in FIG. 8 while the disk D is pressed against the holding member 27 and the holding member 28, and the transportation rollers 112 and 113 are removed from the disk D.

When the transporting unit 17 is rotated to the standby position, the lock switchover member 42 of the first motive force transmitting mechanism 12 is stopped at the position shown in FIG. 15 and the protrusion switchover member 171 retains the position of being moved in the X2 direction. When the transporting unit 17 is restored from the transporting operation position to the standby position, the switchover pin 172 provided on the protrusion switchover member 171 rotates the control plate 167 in the counter-clockwise direction. The driving plate 166 and the protrusion supporting member 160 are also rotated in the clockwise direction. Accordingly, supporting member 163 of the protrusion supporting member 160 protrudes into casing 2 from the transporting unit 17 and is held on the lower face of the supporting member 21. Additionally, the supporting member 163 supports the lower face of the free edge portion on the insertion opening 23 side of the disk D clamped to the turntable 82 from below.

When the switchover member 91 is moved in the (d) direction and the transmission shaft 138 is moved to the non-acting portion 137a of the unit control slot 137, the shutter opening/closing member 126 provided on the inner face of the front face 7 of the casing 2 is moved by the driving pin 127 provided on the switchover member 91. Accordingly, as shown in FIG. 18A, the sliding pins 203 provided on the shutter 201 are guided to the closing portions 202a of the opening/closing cams 202 such that the shutter 201 is lowered in the Z1 direction and the insertion opening 23 formed on the front face of the casing 2 is closed with the shutter 201.

As shown in FIG. 8, the control pin 124 is guided within the first arc potion 121a of the switchover slot 121, and the switchover lever 122 is turned in the counter-clockwise direction. As shown in FIG. 16A, the switchover pin 125 provided on the X1 end of the switchover lever 122 moves the transmission switchover member 401 provided on the inner face of the left side face 9 of the casing 2 in the Y1 direction. Additionally, the first holding switchover member 403 integrally linked with the transmission switchover member 401 is moved in the Y1 direction.

As shown in FIG. 16A, the driving pin 316 provided on the transmission switchover member 401 rotates the second linking member 311 in the clockwise direction Additionally, the first linking member 305 is rotated in the counter-clockwise direction. The restriction guide members 301 and 303 are rotated to the non-acting attitude, and as shown in FIG. 21, the restriction face 301a and the inclined guide face 301b of the restriction guide member 301 are positioned within the clearance portion 21d of the supporting member 21. Additionally, the restriction face 303a and the inclined guide face 303b of the restriction guide member 303 are positioned within the clearance portion 21e. Also, as shown in FIG. 21, the restriction face 301a and the inclined guide face 301b, and the restriction face 303a and the inclined guide face 303b, are positioned on the outer side of the perimeter of the disk D and do not abut against the disk D.

As shown in FIG. 21, when the transmission switchover member 401 is moved in the Y1 direction, the first holding switchover member 403 is also moved in the Y1 direction via the linking spring. At this time, the first holding switchover member 403 is removed from the holding member 26, and the pulling spring 29a rotates the holding member 26 in the γ2 direction. At this point, the disk D is held between the lower face of the supporting member 21 and the holding claws 26b, 27b, and 28b of all of the holding members 26, 27, and 28.

Setting the Disk Driving Mode

Upon the disk D held on the lower face of the supporting member 21 at the selection position (a) having been clamped to the turntable 82, the transporting unit 17 moving to the standby position, and the insertion opening 23 being closed with the shutter 201, the first motor M1 provided to the first motive force transmission mechanism 12 starts again, and the rack member 32 is moved in the Y1 direction and moves the end shown in FIG. 5.

As shown in FIG. 5, the motive force of the rack member 32 at this time does not act upon the slider 31 or the switchover lever 38. The slider 31 and the switchover lever 38 remain stopped. The linking turning lever 44 turns in the counter-clockwise direction and the lock switchover member 42 is turned to the end in the (c) direction. At this time, the locking member 54 is moved to the end in the X1 direction, and the locking member 61 shown in FIG. 10 is also moved to the end in the X1 direction. The restricting shaft 77 provided behind the unit supporting base 13 is guided to the escape hole 56*d* of the lock control hole 56 formed in the locking member 54, and the restricting shafts 78 provided to the front of the unit supporting base 13 are guided to the escape holes 62*d* of the lock control holes 62 formed in the locking member 61 so that the locking members 54 and 61 release the restriction on the restricting shafts 77 and 78.

When the lock switchover member 42 arrives at the movement end edge in the (c) direction, the control pin 176 provided to the linking member 173 shown in FIG. 10 is moved to the second retracting guide portion 47*c* of the protrusion control slot 47 formed on the lock switchover member 42 and the linking member 173 is rotated in the clockwise direction. The linking member 173 moves protrusion switchover member 171 in the X1 direction. When the protrusion switchover member 171 is moved in the X1 direction, similar to the state shown in FIG. 12, the control plate 167 provided on the transporting unit 17 is rotated in the clockwise direction and the driving plate 166 and the protrusion supporting member 160 are rotated in the counter-clockwise direction. As shown in FIGS. 21 and 22, the supporting member 163 provided on the protrusion supporting member 160 is retracted into the transporting unit 17. Additionally, the supporting member 163 is positioned farther toward the outside than the perimeter of the disk D which is clamped to the turntable 82.

When the slider 31 moves to the position shown in FIG. 5, the cam portion formed on the base face 6 and the attitude control pin provided to the switchover lever 38 turns the switchover lever 38 widely in the clockwise direction. As shown in FIG. 7, the driving pin 41 provided to the switchover lever 38 moves to inside an escape portion 86*b* of a driving hole 86 formed on the driving slider 85. Accordingly, the unit supporting base 13 and the driving unit 14 are not subjected to restriction force and are elastically supported by the dampers 71, 72, and 73.

Prior to the unit supporting base 13 being in a state of elastically supported with the dampers 71, 72, and 73, the first holding switchover member 403 is moved in the Y2 direction with the unshown holding disengaging mechanism, as shown in FIG. 22. At this time, the transmission switchover member 401 is constrained with the switchover pin 125 and continues to be stopped in the state of having been moved in the Y1 direction. Additionally, the linking spring is stretched and only the first holding switchover member 403 is moved in the Y2 direction. The holding member 26 is rotated in the clockwise direction by the first holding switchover member 403. Additionally, the second holding switchover member 404 provided on the inner side of the rear side face 10 is moved in the X1 direction, and the holding members 27 and 28 are rotated in the 3 direction with the second holding switchover member 404. The holding claws 26*b*, 27*b*, and 28*b* are then moved farther towards the outside than the perimeter of the disk D, and the disk D is released from being held with the supporting member 21.

When the dampers 71, 72, and 73 elastically support the unit supporting base 13 the unit supporting base 13 is lowered. Additionally, the disk D which is clamped to the turntable 82 and which has been released from the holding claws 26*b*, 27*b*, and 28*b* is slightly removed from the lower face of the supporting member 21 at the selection position (a) toward the Z1 side. In this state, the spindle motor drives the turntable 82, the disk D rotates, the signals recorded in the disk D are read by the optical head 83, or signals are recorded to the disk D.

In the event of vibrations from the vehicle body acting upon the casing 2, the unit supporting base 13 elastically supported by the dampers 71, 72, and 73 moves vertically and horizontally, thereby reducing read error of the signals reproduced by the optical head due to the vibration absorbing functions of the dampers 71, 72, and 73.

Disk Storage Operation

When the driving unit has completed driving a disk to the disk storing region 20 for storage, the first motor M1 of the first motive force transmission mechanism 12 is started, the rack member 32 is returned from the position shown in FIG. 5 to the Y2 direction, the linking turning lever 44 is rotated in the clockwise direction, and lock switchover member 42 is moved in the (b) direction. At this time, the first motor M1 stops at the point wherein the locking member 54 shown in FIG. 1, and the locking member 61 shown in FIG. 10, are moved only approximately half the distance of the entire movement range in the X2 direction. The constraint shaft 77 is moved to the lifting portion 56*b* of the locking control hole 56 formed on the locking member 54, and the constraint shafts 78, 78 are moved to the lifting portions 62*b*, 62*b* of the locking control holes 62, 62 so that the unit supporting base 13 and the driving unit 14 are lifted up and the disk D clamped to the turntable 82 is pushed onto the lower face of the supporting member 21 at the selection position (a).

When the lock switchover member 42 is moved in the (b) direction and the unit supporting base 13 is lifted up, the control pin provided on the linking member 173 is led from the second retracting guide portion 47*c* of the protrusion control slot 47 formed on the lock switchover member 42 to the protrusion guide portion 47*b*, as shown in FIG. 15. Additionally, the linking member 173 is rotated in the counter-clockwise direction and the protrusion switchover member 171 is moved in the X2 direction. The control plate 167 within the transporting unit 17 at the standby position is rotated in the counter-clockwise direction, and the driving plate 166 and the protrusion supporting member 160 are both rotated in the clockwise direction. The supporting member 163 of the protrusion supporting member 160 is protruded from the transporting unit 17 into the casing 2, and the upper face of the disk D pressed against the lower face of the supporting member 21 at the selection position (a) is supported with the above-described supporting member 163.

As shown in FIG. 21, the first holding switchover member 403 provided on the inner side of the left side face 9 is moved in the Y1 direction by the unshown holding disengaging mechanism, the first holding switchover member 403 is removed from the holding member 26, and the pulling spring 29*a* rotates the holding member 26 in the counter-clockwise direction. The second holding switchover member 404 provided on the rear side face 10 is moved in the X2 direction, the second holding switchover member 404 is removed from the holding members 27 and 28, and the pulling springs 29*b* and 29*c* rotate the holding members 27 and 28 in the γ4 direction. Accordingly, the disk D clamped to the turntable 82 is held with the lower face of the supporting member 21 at the selection position (a) and all of the holding claws 26*b*, 27*b*, and 28*b*.

If the disk D pushed onto the lower face of the supporting member 21 vibrates vertically due to automobile vibrations and so forth, when the holding members 26, 27, and 28 are rotating with the pulling force of the pulling springs 29*a*, 29*b*, and 29*c*, the holding claws 26*b*, 27*b*, and 28*b* cannot enter below the lower face of the disk D. Therefore, it can be estimated that the disk D is not in a state of being securely held with the holding claws 26b, 27b, and 28b. At this time, the holding member 26, 27, and 28 are set to a holding state only with the force of the pulling springs 29a, 29b, and 29c, and is a risk of the disk D continuing to be in a state of being held incompletely by the supporting member 21.

However, at this time, the supporting member 163 supports the edge portion on the insertion opening 23 side of the disk D from below, and the upper face 163a of the supporting member 163 is positioned in a position at the same height as the lower face of the disk D or at a higher position thereto. Accordingly, the disk D pushed onto the supporting member 21 is arranged to be pushed up from below by the supporting member 163 so that even if automobile vibrations and so forth are acting, the disk D does not easily vibrate. Therefore, when the holding members 26, 27, and 28 rotate, the holding claws 26b, 27b, and 28b can be securely moved to the lower face of the disk D.

Thereafter, upon the first motor M1 of the first motive force transmission mechanism 12 moving the rack member 32 in the Y2 direction and the slider 31 and switchover lever 38 being moved in the Y2 direction, the driving slider 85 provided on the lower face of the unit supporting base 13 is moved in the Y2 direction. Additionally, the clamping mechanism provided to the turntable 82 operates and the clamping claws are retracted to within the center protrusion portion 82b of the turntable 82, thereby releasing the clamping of the disk with the turntable 82.

When the first motor M1 of the first motive force transmission mechanism 12 moves the rack member 32 in the Y2 direction, the linking turning lever 44 turns in the clockwise direction and the lock switchover member 42 is moved in the (b) direction. The locking member 54 shown in FIG. 1 returns to the initial position at the X2 side and the locking member 61 shown in FIG. 10 returns to the initial position at the X2 side. The restricting shaft 77 provided behind the unit supporting base 13 is held at the restricting portion 56a of the lock control hole 56 and the restricting shafts 78 provided to the front of the unit supporting base 13 are held at the restricting portions 62a of the lock control hole 62. Accordingly, the unit supporting base 13 and the driving unit 14 are lowered to a position near the base face 6.

When the unit supporting base 13 and the driving unit 14 begin to be lowered, as shown in FIG. 15, and also as shown with a broken line in FIG. 21, the free edge on the insertion opening 23 of the disk D is supported by the supporting member 163. Therefore, when the turntable 82 comes loose from the center hold Da of the disk D towards the lower side, the free edge of the disk D is not lowered towards the lower side, and a center convex portion 82b of the turntable 82 can be securely pulled out from the center hole Da of the disk D hold by the supporting member 21 toward the Z1 side.

When the lock switchover member 42 is positioned at the end edge in the (b) direction, the constraint shaft 77 provided on the unit supporting base 13 is constrained by the constraining portion 56a. Additionally, the constraint shafts 78, 78 arrive to be held by the constraint portions 62a, 62a, as shown in FIG. 12 and the control pin 176 are moved to the first retracting guide portion 47a of the protrusion control slot 47. The linking member 173 is rotated in the clockwise direction, and the protrusion switchover member 171 is moved in the X1 direction. Additionally, the control plate 167 within the transporting unit 17 is rotated in the clockwise direction, the driving plate 166 and the protrusion supporting member 160 are rotated in the counter-clockwise direction, and the supporting member 163 is retracted into the transporting unit 17 and removed from the perimeter of the disk D.

Disk Discharging Operation

When the driving unit 14 has completed discharging a disk D from the insertion opening 23, in the disk driving mode shown in FIG. 13, the spindle motor stops and the rotation of the turntable 82 stops. The rack member 32 of the first motive force transmission mechanism 12 moves in the Y2 direction, and the locking members 54 and 61 are moved in the X2 direction. Accordingly, the unit supporting base 13 is lifted, and the disk D is pressed against the lower face of the supporting member 21 at the selecting position (a).

The first holding switchover member 403 is moved in the Y1 direction, the second holding switchover member 404 is moved in the X2 direction, the holding member 26 is rotated in the γ2 direction, the holding members 27 and 28 are rotated in the γ4 direction, and the disk is temporarily held by the holding claws 26b, 27b, and 28b and the lower face of the supporting member 21.

As shown in FIG. 9, the switchover member 91 is moved in the (e) direction, and the transporting unit 17 is moved from the standby position to the transporting operation position. At this time, the third motor M3 rotates the transporting rollers 112 and 113 in the carry-out direction. When the transporting unit 17 turns to the transporting operation position, the Y1 edge of the disk D supported by the supporting member 21 is smoothly nipped between the transporting rollers 112 and 113 and the nipping portion 106. Holding member 26 in a position close to the insertion opening 23 is rotated in the γ1 direction, as shown in FIG. 20, in accordance with the transporting unit 17 being moved to the transporting operation position.

When the transporting unit 17 moves to the transporting operation position, and the rotation of the transporting rollers 112 and 113 stops, the rack member 32 of the first motive force transmission mechanism 12 moved in the Y2 direction; the clamping of the disk D at the turntable 82 is disengaged; the locking member 54 and the locking member 61 are moved in the X2 direction by the moving force of the rack member 32 in the Y2 direction; the unit supporting base 13 and the driving unit 14 are lowered toward the base face; and the center protrusion portion 82b of the turntable 82 is removed in the Z1 direction from the center hole Da of the disk D. At this time, the disk D is held with the holding claws 27b and 28b, and is nipped by the transporting rollers 112 and 113 and the nipping portion 106. Therefore, the turntable 82 can easily be pulled out from the disk D toward the lower side.

The shutter opening/closing member 126 moves in the X2 direction due to the moving force of the switchover member 91 in the (e) direction at the time of the transporting unit 17 moving to the transporting operation position. As shown in FIG. 18B, the shutter 201 rises and the insertion opening 23 is released.

The transporting rollers 112 and 113 are turned in the carry-out direction and the transporting unit 17 is turned from the transporting operation position shown in FIG. 20 to the standby position shown in FIG. 19. The disk D is discharged from the insertion opening 23.

When discharging a disk D within the disk sorting region 20, the driving unit 14 is moved to the retracted position, and the transporting unit 17 is moved to the standby position, the selecting shafts 151A, 151B, and 151C are rotated such that the supporting member 21 holding the disk to be discharged is moved to the selecting position (a).

The driving unit 14 is turned to the intervention position shown in FIG. 19, and the locking members 54 and 61 raise the unit supporting base 13 and driving unit 14 in the Z2 direction, thereby clamping the disk D with the turntable 82. Following the transporting unit 17 is moved to the transporting operation position and the disk D is nipped between the transporting rollers 112 and 113, and the nipping portion 106. The clamping of the disk D with the turntable 82 is disengaged, the center protrusion portion 82b of the turntable 82 is removed downwards from the center hole Da of the disk D, and the transporting unit 17 is turned to the standby position while rotating the transporting rollers 112 and 113 in the carry-out direction, thereby discharging the disk D from the insertion opening 23.

It is therefore intended that the foregoing detailed description be regarded as illustrative rather than limiting, and that it be understood that it is the following claims, including all equivalents, that are intended to define the spirit and scope of this invention.

What is claimed is:

1. A disk-storing disk device comprising a casing, the casing comprising:
    a plurality of supporting members which are operative to support a disk, the plurality of supporting members being disposed in a stacked manner in an axial direction of the disk;
    a supporting member selecting mechanism operative to move one of the plurality of supporting members to a selecting position;
    a driving unit comprising a rotational driving unit operative to clamp the disk when the disk is held by a selected supporting member members at the selecting position, and to rotationally drive the disk;
    a transporting mechanism operative to transport the disk when the disk is inserted from an insertion opening of the casing to the selected supporting member at the selecting position;
    a restriction guide member comprising a restriction face, the restriction guide member being turnably supported between a guide attitude and a non-acting attitude; and
    a transmission member operative to turn the restriction guide member;
    wherein, when the transporting mechanism transports the disk toward the selected supporting member at the selecting position, the restriction guide member assumes the guide attitude and faces the supporting member at the selecting position, and when the disk is transported between the selected supporting member at the selecting position and the restriction face, the supporting member selection mechanism moves the selected supporting member, the restriction guide member assumes the non-acting attitude and is retracted to a position where the restriction face does not overlap with the selected supporting member and the disk, and the selected supporting member supports the disk,
    wherein the restriction guide member is turnably supported by a face within the casing, the face facing an edge of at least one of the supporting members and extending along a direction of movement of the at least one of the supporting members, wherein when the restriction guide member assumes the guide attitude, the orientation of the restriction face is such that the restriction face is parallel with the face of a disk face of the disk supported by the supporting member at the selecting position and faces an edge of the disk, and when the restriction guide member assumes the non-acting attitude, the orientation of the restriction face is such that the restriction face is perpendicular to the disk face of the disk supported by the selected supporting member at the selecting position and is retracted to a position to not overlap with the disk.

2. The disk-storing disk device of claim 1, wherein the face is a side face of the casing.

3. The disk-storing disk device of claim 1, wherein each of the supporting members of the plurality of supporting members comprise a holding member operative to hold the disk between the supporting member and the holding member, with the restriction face extending further toward the transporting mechanism side than the holding member when the restriction guide member assumes the guide attitude;
    and wherein after the restriction face is facing the selected supporting member at the selecting position and the disk transported by the transporting mechanism is supplied between the restriction face and the selected supporting member at the selecting position, the disk is transported to a position where the disk is held between the holding member and the supporting member.

4. The disk-storing disk device of claim 1, further comprising:
    a shutter operative to open and close the insertion opening of the casing; and
    a switchover member operative to switch the shutter between an opened state and a closed state;
    wherein a moving force of the switchover member turns the restriction guide member between the guide attitude and the non-acting attitude via the transmission member; and
    wherein, when the switchover member moves the shutter to the opened state, the restriction guide member is turned to the guide attitude.

5. The disk-storing disk device of claim 1, wherein the restriction guide member comprises an inclined guide face that is continuous from the restriction face such that when the restriction guide member assumes the guide attitude, the inclined guide face is inclined in a direction away from the selected supporting member at the selecting position, and the closer to the transporting mechanism, the greater a degree of inclining away from the selected supporting member is.

6. The disk-storing disk device of claim 1, wherein a recessed clearance portion is formed on an edge of each supporting member of the plurality of supporting members, and when the restriction guide member assumes the non-acting attitude, the restriction face of the restriction guide member is positioned within the clearance portion.

7. The disk-storing disk device of claim 5, wherein a recessed clearance portion is formed on an edge of each supporting member of the plurality of supporting members, and when the restriction guide member assumes the non-acting attitude, the restriction face of the restriction guide member and the inclined guide face are positioned within the clearance portions.

8. The disk-storing disk device of claim 1, further comprising:
    a second restriction guide member, the restriction guide member and the second restriction guide member forming a pair of restriction guide members; and
    a linking member in mechanical communication with the transmission member that links with the pair of restriction guide members to provide synchronous turning of the pair of restriction guide members.

9. The disk-storing disk device of claim 8, further comprising a linking spring which is a pulling coil spring, the linking spring spanning between the linking member and the transmission member, wherein, when the restriction guide member turns from the non-acting attitude to the guide attitude, a movement force of the transmission member is transmitted to the linking member through the linking spring.

10. A disk-storing disk device comprising a casing, the casing comprising:
a plurality of supporting members operative to support a disk, the plurality of supporting members disposed in a stacked manner in an axial direction of a disk;
a supporting member selecting mechanism operative to move one of the plurality of supporting members to a selecting position;
a driving unit comprising a rotational driving unit operative to clamp the disk when the disk is held by a selected supporting member at the selecting position, and to rotationally drive the disk;
a transporting mechanism operative to transport the disk when the disk is inserted from an insertion opening of the casing to the a selected supporting member at the selecting position;
a shutter operative to open and close an insertion opening of the casing; and
a switchover member operative to switch the shutter between an opened state and a closed state;
a restriction guide member comprising a restriction face, the restriction guide member being turnably supported between a guide attitude and a non-acting attitude; and
a transmission member operative to turn the restriction guide member;
wherein, when the shutter is moved into the opened state by the switchover member, the restriction guide member is turned to the guide attitude via the transmission member, and the restriction face faces the supporting member at the selecting position;
and wherein, when the switchover member moves the shutter to the closed state, the restriction guide member is turned to the non-acting attitude via the transmission member and the restriction face is retracted to a position where the restriction face does not overlap with the selected supporting member and the disk supported by the selected supporting member,
wherein the restriction guide member is turnably supported by a face within the casing, the face facing an edge of at least one of the supporting members and extending along the direction of movement of the at least one of the supporting members, wherein when the restriction guide member assumes the guide attitude, the orientation of the restriction face is such that the restriction face is parallel with a disk face of the disk supported by the supporting member at the selecting position and faces an edge of the disk, and when the restriction guide member assumes the non-acting attitude, the orientation of the restriction face is such that the restriction face is perpendicular to the disk face of the disk supported by the selected supporting member at the selecting position and is retracted to a position that does not overlap with the disk.

11. The disk-storing disk device of claim 10, wherein the face is a side face of the casing.

12. The disk-storing disk device of claim 10, wherein each of the supporting members comprises a holding member operative to hold the disk between the supporting member and the holding member, with the restriction face extending further toward the transporting mechanism side than the holding members in the event that the restriction guide member assumes the guide attitude;
and wherein after the restriction face is facing the selected supporting member at the selecting position and the disk transported by the transporting mechanism is supplied between the restriction face and the supporting member at the selecting position, the disk is transported to a position where the disk is held between the holding member and the supporting member.

13. The disk-storing disk device of claim 10, wherein the restriction guide member comprises an inclined guide face continuous from the restriction face such that in the event that the restriction guide member assumes the guide attitude, the inclined guide face is inclined in a direction away from the selected supporting member at the selecting position, and the closer to the transporting mechanism, the greater the degree of inclining away from the selected supporting member is.

14. The disk-storing disk device of claim 10, wherein a recessed clearance portion is formed on an edge of each supporting member of the plurality of supporting members, and when the restriction guide member assumes the non-acting attitude, the restriction face of the restriction guide member is positioned within the clearance portion.

15. The disk-storing disk device of claim 13, wherein a recessed clearance portion is formed on an edge of each supporting member of the plurality of supporting members, and wherein when the restriction guide member assumes the non-acting attitude, the restriction face of the restriction guide member and the inclined guide face are positioned within the clearance portions.

16. The disk-storing disk device of claim 10, further comprising:
a second restriction guide member, the restriction guide number and the second restriction guide member forming a pair of restriction guide members; and
a linking member in mechanical communication with the transmission member that links the pair of restriction guide members so as to effect synchronous turning of the pair of restriction guide members.

17. The disk-storing disk device of claim 16, further comprising a linking spring which is a pulling coil spring, the linking spring spanning between the linking member and the transmission member, wherein, when the restriction guide member turns from the non-acting attitude to the guide attitude, a movement force of the transmission member is transmitted to the linking member through the linking spring.

* * * * *